(12) United States Patent
Lee

(10) Patent No.: US 10,019,091 B2
(45) Date of Patent: Jul. 10, 2018

(54) DISPLAY DEVICE INTEGRATED WITH TOUCH SCREEN

(71) Applicant: G2TOUCH Co., LTD, Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 0 days.

(21) Appl. No.: 15/353,668

(22) Filed: Nov. 16, 2016

(65) Prior Publication Data

US 2017/0139515 A1  May 18, 2017

(30) Foreign Application Priority Data

Nov. 16, 2015  (KR) .......................... 10-2015-0160748

(51) Int. Cl.
*G02F 1/1335* (2006.01)
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01); *G06F 3/044* (2013.01); *G02F 2201/121* (2013.01); *G06F 2203/04103* (2013.01); *G06F 2203/04107* (2013.01)

(58) Field of Classification Search
CPC ................... G06F 3/0412; G06F 3/044; G06F 2203/04107; G06F 2203/04103; G02F 1/13338; G02F 2201/121

See application file for complete search history.

(56) References Cited

U.S. PATENT DOCUMENTS

| 6,057,903 | A | * | 5/2000 | Colgan | ............. G02F 1/134309 345/173 |
|---|---|---|---|---|---|
| 6,208,399 | B1 | * | 3/2001 | Ohta | ................. G02F 1/134363 349/139 |
| 2010/0156827 | A1 | * | 6/2010 | Joo | ..................... G02F 1/13338 345/173 |
| 2012/0218199 | A1 | * | 8/2012 | Kim | ..................... G06F 3/0412 345/173 |
| 2013/0147730 | A1 | * | 6/2013 | Chien | ................... G06F 3/0412 345/173 |
| 2013/0229620 | A1 | * | 9/2013 | Hammer | .............. A61B 3/1025 351/206 |
| 2013/0241869 | A1 | * | 9/2013 | Kida | ...................... G06F 3/044 345/174 |
| 2013/0314371 | A1 | * | 11/2013 | Lee | ....................... G06F 3/0412 345/174 |
| 2015/0138453 | A1 | * | 5/2015 | Jang | ....................... G06F 3/044 349/12 |
| 2016/0098140 | A1 | * | 4/2016 | Lee | ....................... G06F 3/0416 345/173 |
| 2016/0274712 | A1 | * | 9/2016 | Liu | ....................... G06F 3/0412 |

* cited by examiner

*Primary Examiner* — Donald Raleigh

(57) ABSTRACT

Disclosed herein is a display device integrated with a touch screen. According to the present invention, the display device integrated with a touch screen includes a first substrate and a second substrate disposed to be opposite to each other, having a liquid crystal layer interposed therebetween, in which the first substrate is formed with a color filter and a common electrode, a sensor pattern and a sensor signal line sensing a touch signal are formed beneath a transparent substrate of the second substrate, and a pixel electrode and a driving signal line driving the display device are formed beneath the sensor signal line.

18 Claims, 19 Drawing Sheets

PRECHARGE VOLTAGE

DRIVING BACK GENERATION

DISPLAY DEVICE INTEGRATED WITH TOUCH SCREEN

CROSS-REFERENCE TO RELATED APPLICATIONS

This application claims priority from and the benefit of Korean Patent Application No. 10-2015-0160748, filed on Nov. 16, 2015, which is hereby incorporated by reference for all purposes as if fully set forth herein.

BACKGROUND OF THE INVENTION

Field of the Invention

The present invention relates to a display device integrated with a touch screen, and more particularly, to a display device integrated with a touch screen capable of improving a disposition structure of a sensor signal line and solving a problem of parasitic capacitance inside the display device.

Discussion of the Background

Generally, a touch screen is an input device that is added on display devices such as a liquid crystal display (LCD), a plasma display panel (PDP), an organic light emitting diode (OLED), and an active matrix organic light emitting diode (AMOLED) or designed to be built in the display devices and is a device that recognizes objects such as a finger and a touch pen as an input signal when the objects contact the screen. In recent years, a touch input device has been mostly mounted in mobile devices such as a mobile phone, personal digital assistants (PDA), and a portable multimedia player (PMP). In addition, the touch input device has been used for the whole industrial fields such as, navigation, a netbook, a notebook, a digital information device, a desk top computer using a touch input support operating system, an internet protocol TV (IPTV), a cutting edge fighter, a tank, and an armored car.

The touch screen used for the foregoing display device, or the like may be divided into a touch screen add-on type display device, a touch screen on-cell type display device, and a touch screen in-cell type display device depending on a structure thereof. The touch screen add-on type display device is based on a scheme of individually manufacturing a display device and a touch screen and then attaching the touch screen on an upper plate of the display device. The touch screen on-cell type display device is based on a scheme of directly forming elements configuring a touch screen on a surface of an upper glass substrate of the display device. As illustrated in FIG. 1, the touch screen in-cell type display device has a touch screen embedded therein, and as a result slimness and durability of the display device may be increased.

However, the touch screen add-on type display device has a structure in which the completed touch screen is mounted on the display device and therefore has a problem in that it is thick in thickness and dark in brightness of the display device to reduce visibility. Further, the touch screen on-cell type display device has a structure in which a separate touch screen is formed on an upper surface of the display device and therefore may reduce a thickness over the touch screen add-on type display device. However, the touch screen on-cell type display device has a problem in that the overall thickness is increased and the number of processes is increased because of a driving electrode and a sensing electrode configuring the touch screen and an insulating layer for insulating between the driving electrode and the sensing electrode and therefore manufacturing costs of the touch screen-on cell type display device is increased.

In contrast, the touch screen in-cell type display device may improve the durability and achieve the thinness and therefore has an advantage of solving the problems caused by the touch screen add-on type display device and the touch screen on-cell type display device.

The existing touch screen in-cell type display device has a problem in that sensor signal lines and driving signal lines within the display device are often visualized by an observer and when the sensor signal lines are disconnected, performance of the touch screen deteriorates.

Further, the touch screen in-cell type display device has a problem in that parasitic capacitance between a touch sensor layer made of a conductive material and a pixel electrode layer made of a metal material is considerably increased.

RELATED ART DOCUMENT

Patent Document

Korean Patent Publication No. 10-1144723 (May 3, 2012)

SUMMARY OF THE INVENTION

An object of a display device integrated with a touch screen according to the present invention is to provide a display device having a touch screen of a single layer embedded therein.

Another object of the present invention is to prevent a signal line from being observed on a display device by allowing a sensor signal line to be positioned on the same line as a driving signal line of a pixel electrode in a structure in which a sensor pattern and the pixel electrode are stacked.

Still another object of the present invention is to prevent a recognition error of a touch signal due to a disconnection of a sensor signal line by forming a plurality of sensor signal lines on a single sensor pattern disposed in a matrix structure.

Yet another object of the present invention is to reduce a wiring resistance by forming a sensor signal line disposed in a light shielding area of a display device as a metal wiring.

According to an exemplary embodiment of the present invention, there is provided a display device integrated with a touch screen including a first substrate and a second substrate disposed to be opposite to each other, having a liquid crystal layer interposed therebetween, in which the first substrate is formed with a color filter and a common electrode, a sensor pattern and a sensor signal line sensing a touch signal are formed beneath a transparent substrate, and a pixel electrode and a driving signal line driving the display device are formed beneath the sensor pattern and the sensor signal line.

According to another exemplary embodiment of the present invention, there is provided a display device integrated with a touch screen including a first substrate and a second substrate disposed to be opposite to each other, having a liquid crystal layer interposed therebetween, in which a pixel electrode and a driving signal line driving the display device are formed on an insulating substrate of the first substrate, a sensor pattern and a sensor signal line sensing a touch signal are formed beneath a transparent substrate of the second substrate, and a color filter and a common electrode are formed at a lower portion of the sensor pattern and the sensor signal line.

The sensor signal line and the driving signal line may be positioned on the same line.

A black matrix may be formed between the plurality of color filters formed on the insulating substrate of the first substrate and the driving signal line may be formed on the same line of the area in which the black matrix is formed.

One side of the sensor signal line may be a transparent wiring made of a transparent conductive material and the other side thereof may be a metal wiring made of a metal conductive material.

The second substrate may be further formed with a guard area between a touch sensor layer on which the sensor pattern and the sensor signal line are formed and a pixel electrode layer on which the pixel electrode and the driving signal line are formed.

The sensor pattern may have a matrix structure in which at least one column and at least one row are disposed and each of the sensor patterns is connected to a touch drive IC by at least two sensor signal lines.

The TDI may transfer the same driving signal to the touch sensor layer and the guard area.

The TDI may further include a driving signal amplifier amplifying the driving signal transferred to the guard area.

The guard area may be divided into a plurality of areas and each of the divided areas may be selectively driven, coinciding with a block driving area of the touch sensor layer.

DETAILED DESCRIPTION OF THE ILLUSTRATED EMBODIMENTS

In order to sufficiently understand operational advantages of the present invention and objects accomplished by embodiments of the present invention, the accompanying drawings showing embodiments of the present invention and contents described in the accompanying drawings should be referred.

Figure 1:
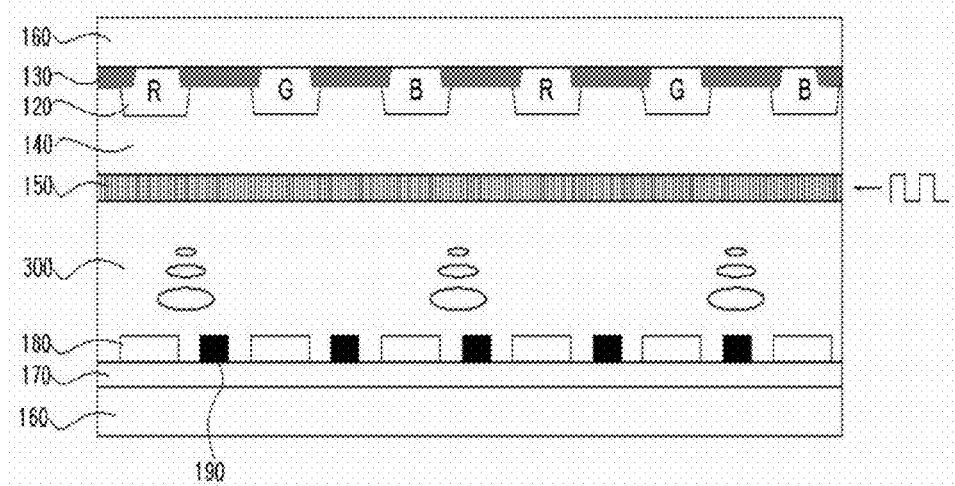
FIG. 1 is a diagram illustrating a configuration of the existing display device integrated with a touch screen.
Figure 2:
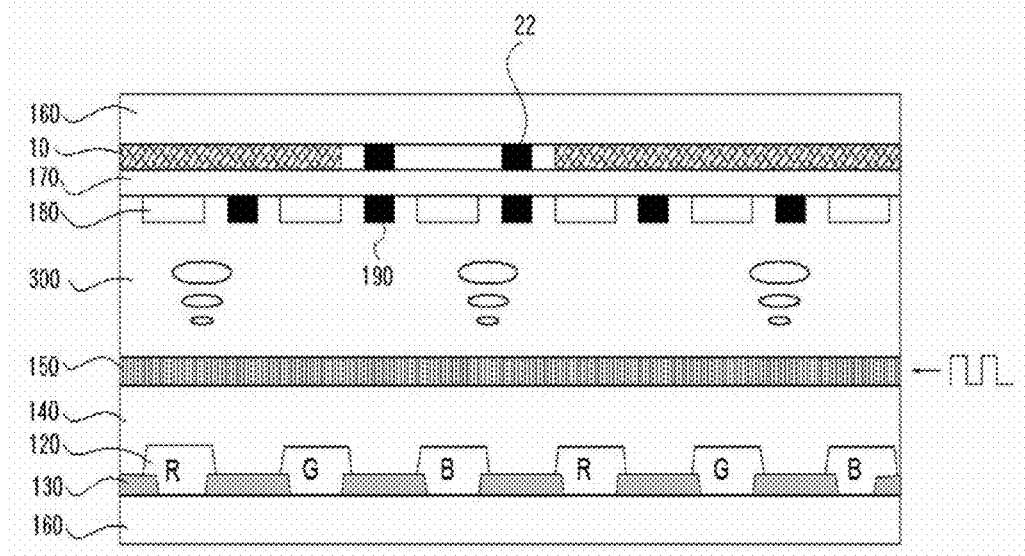
FIG. 2 is a diagram illustrating a display device integrated with a touch screen according to a first embodiment of the present invention.

FIG. 2 is a diagram illustrating a display device integrated with a touch screen according to a first embodiment of the present invention, in which the display device largely includes a first substrate, a second substrate, and a liquid crystal layer.

Figure 3:
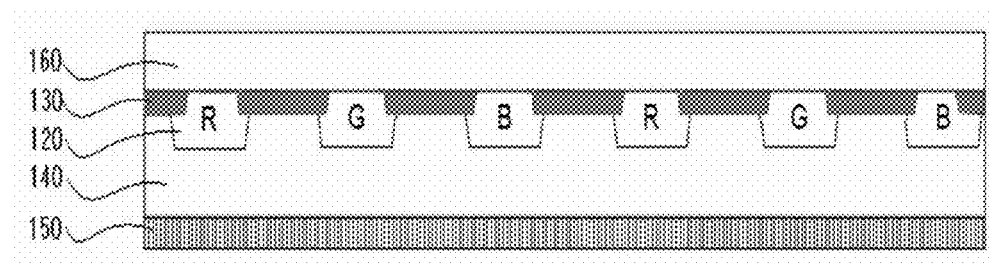
FIG. 3 is a diagram illustrating a configuration of a first substrate in the display device integrated with a touch screen according to the first embodiment of the present invention.
Figure 4:
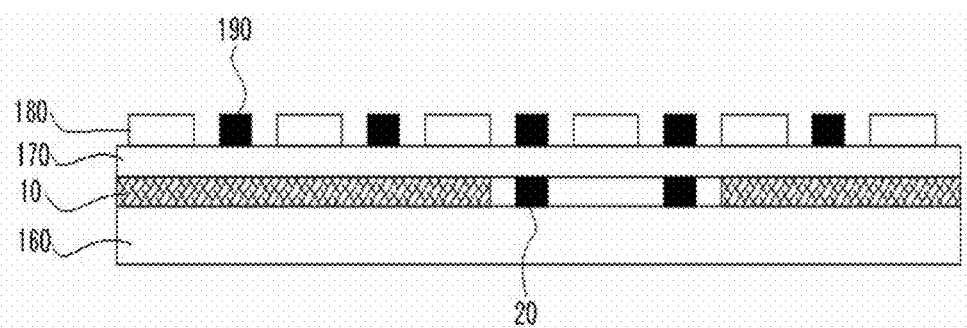
FIG. 4 is a diagram illustrating a configuration of a second substrate in the display device integrated with a touch screen according to the first embodiment of the present invention.

As illustrated in FIG. 3, in the first substrate of the first embodiment, a plurality of color filters 120 are formed beneath an insulating substrate 160 and black matrixes 130 are formed between the respective color filters 120.

Further, a cover layer 140 is formed beneath the color filter 120 and the black matrix 130 and a common electrode 150 is formed beneath the cover layer 140.

Further, in a second substrate of a second embodiment, sensor patterns 10 and sensor signal lines 22 on the insulating substrate 160 are formed in the same layer to form a touch sensor layer, a passivation layer 170 is formed on the touch sensor layer, and pixel electrodes 180 and driving signal lines 190 that drive the display device are formed on the passivation layer 170.

Figure 5A:
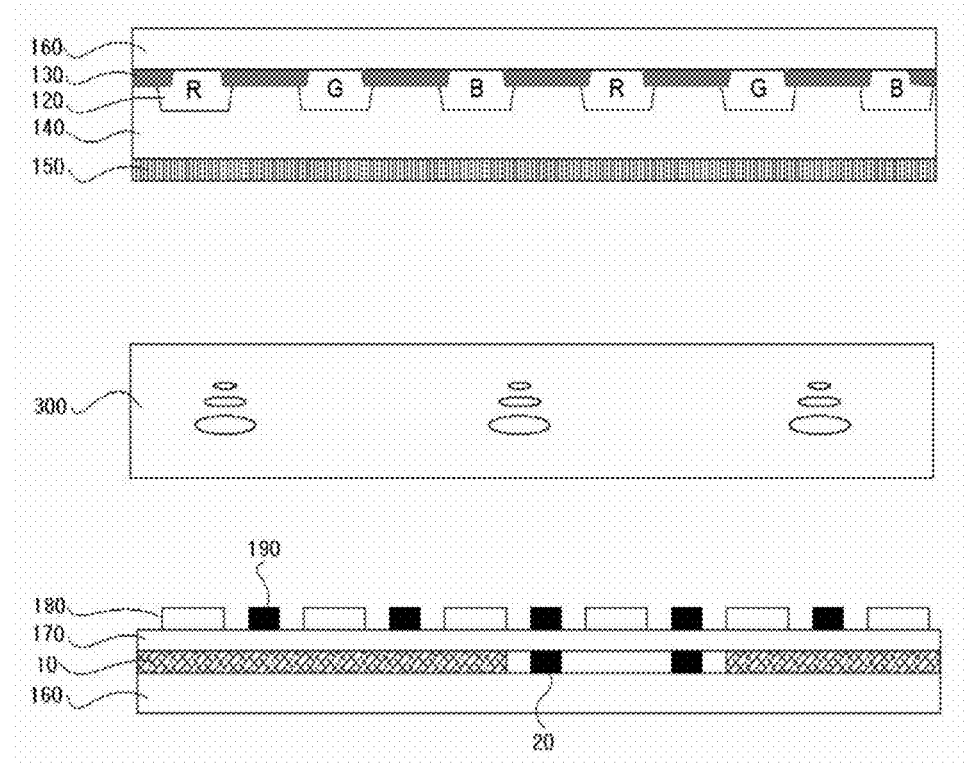
FIGS. 5A to 5C are diagrams illustrating a concept of a manufacturing process of a display device integrated with a touch screen according to the present invention.
Figure 5B:
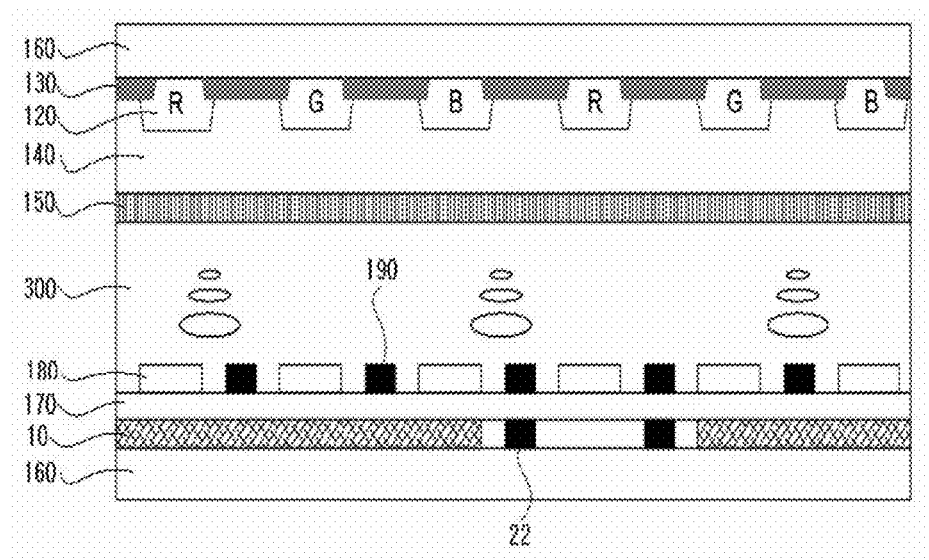
Figure 5C:
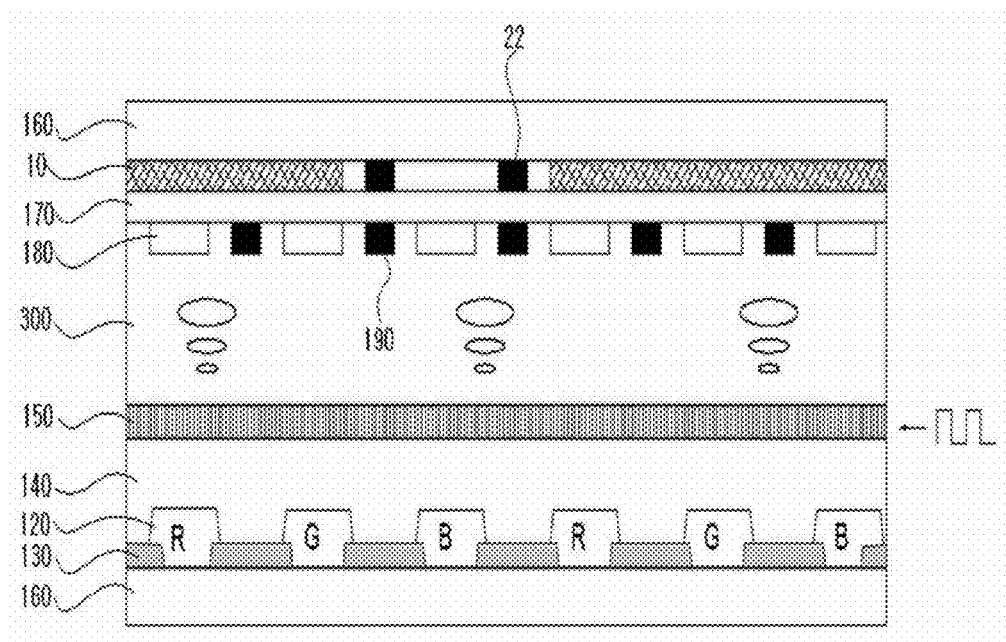

As illustrated in FIG. 5A, the so formed first substrate and second substrate are disposed to be opposite to each other, having a liquid crystal layer 300 interposed therebetween. At this point, the first substrate is positioned over the liquid crystal layer 300 and the second substrate is positioned under the liquid crystal layer 300. As illustrated in FIG. 5B, if the first substrate and the second substrate are coupled to each other and then an up-and-down position thereof is inverted, as illustrated in FIG. 5C, the first substrate and the second substrate are formed like the first embodiment. At this point, the first substrate is positioned under the liquid crystal layer 300 and the second substrate is positioned over the liquid crystal layer 300.

In the touch screen integrated with a touch screen according to the first embodiment of the present invention, when the first and second substrates are stacked, the plurality of color filters 120 are disposed in an area in which the touch sensor 10 is disposed and the driving signal lines 190 are disposed on the same line as an area in which the black matrixes 130 are formed.

Further, the sensor signal line 22 and the driving signal line 190 are positioned on the same line.

In other words, the sensor signal line 22 and the driving signal line 190 are disposed on the same line in the area in which the black matrixes 130 are formed, thereby preventing the signal lines from being visualized by an observer.

Further, in the first embodiment of the present invention, the sensor pattern 10 and the sensor signal line 22 are made of at least one transparent conductive material of indium tin oxide (ITO), antimony tin oxide (ATO), carbon nano tube (CNT), and indium zinc oxide (IZO).

Figure 6:
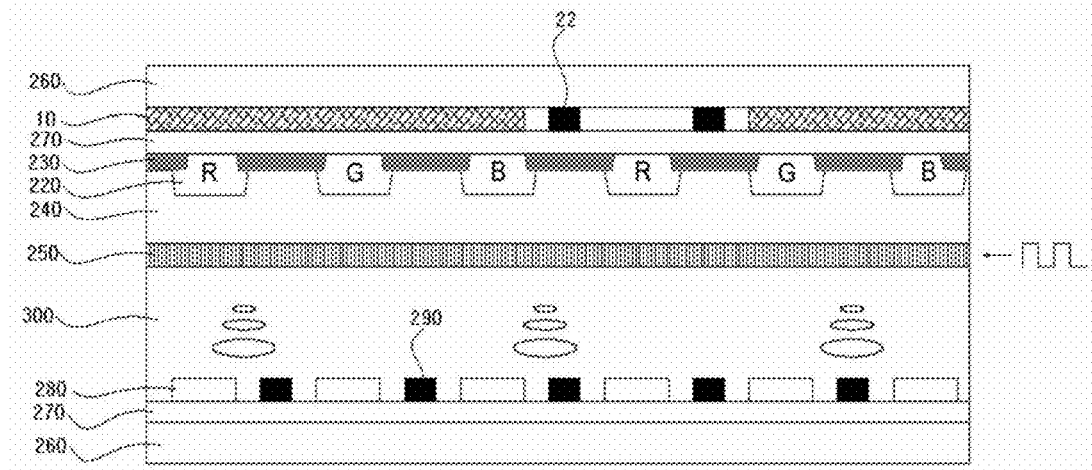
FIG. 6 is a diagram illustrating a display device integrated with a touch screen according to a second embodiment of the present invention.

FIG. 6 is a diagram illustrating a display device integrated with a touch screen according to a second embodiment of the present invention, in which the display device includes the first substrate, the second substrate, and the liquid crystal layer.

Figure 7:
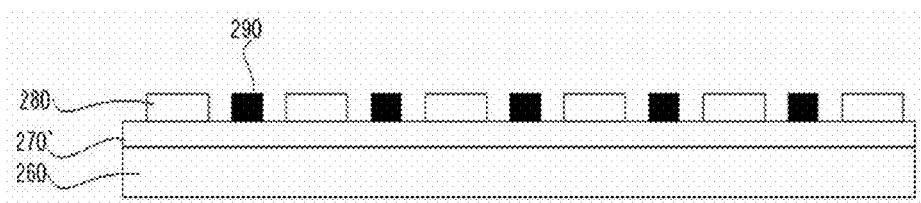
FIG. 7 is a diagram illustrating a configuration of a first substrate according to the display device integrated with a touch screen according to the second embodiment of the present invention.

As illustrated in FIG. 7, in the first substrate of the second embodiment, a passivation layer 270' is formed on an insulating substrate and a pixel electrode 280 and a driving signal line 290 are formed on the passivation layer 270'.

Figure 8:
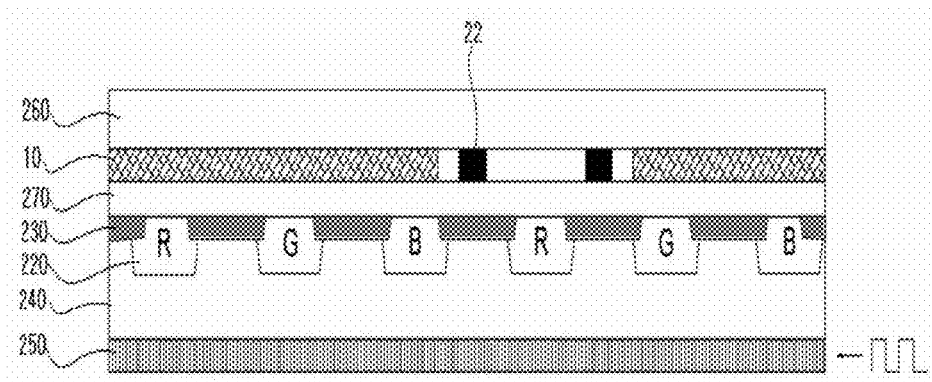
FIG. 8 is a diagram illustrating a configuration of a second substrate according to the display device integrated with a touch screen according to the second embodiment of the present invention.

Further, as illustrated in FIG. 8, in the second substrate of the second embodiment, the sensor patterns 10 and the sensor signal lines 22 beneath an insulating substrate 260 are formed in the same layer to form a touch sensor layer and a passivation layer 270 is formed beneath the touch sensor layer.

Further, a plurality of color filters 220 are formed beneath the passivation layer 270, the black matrixes 230 are formed between the respective color filters 220, a cover layer 240 is formed beneath the color filter 220 and the black matrix 230, and a common electrode 250 is formed beneath the cover layer 240.

Figure 9:
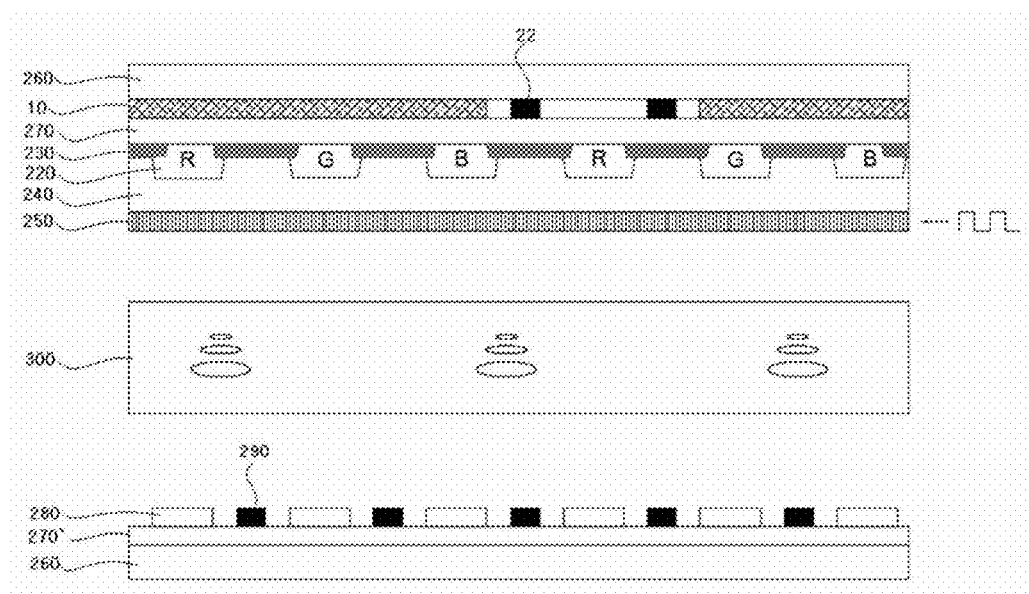
FIG. 9 is a diagram illustrating a coupled disposition structure of the first substrate, a liquid crystal layer, and the second substrate in the display device integrated with a touch screen according to the second embodiment of the present invention.

As illustrated in FIG. 9, the so formed first substrate and second substrate are disposed to be opposite to each other, having the liquid crystal layer 300 interposed therebetween. At this point, the first substrate is positioned under the liquid crystal layer 300 and the second substrate is positioned over the liquid crystal layer 300 and when the first substrate and the second substrate are coupled to each other, the first substrate and the second substrate are formed like FIG. 6 described above.

In the touch screen integrated with a touch screen according to the second embodiment of the present invention, when the first and second substrates are stacked, the plurality of color filters 220 are disposed in an area in which the touch sensor 10 is disposed and the driving signal lines 290 are disposed on the same line as an area in which the black matrixes 230 are formed.

Further, the sensor signal line 22 and the driving signal line 290 are positioned on the same line.

In other words, the sensor signal line 22 and the driving signal line 290 are disposed on the same line in the area in which the black matrixes 230 are formed, thereby preventing the signal lines from being visualized by an observer.

Further, in the second embodiment of the present invention, the sensor pattern 10 and the sensor signal line 22 are made of at least one transparent conductive material of indium tin oxide (ITO), antimony tin oxide (ATO), carbon nano tube (CNT), and indium zinc oxide (IZO).

Figure 10:
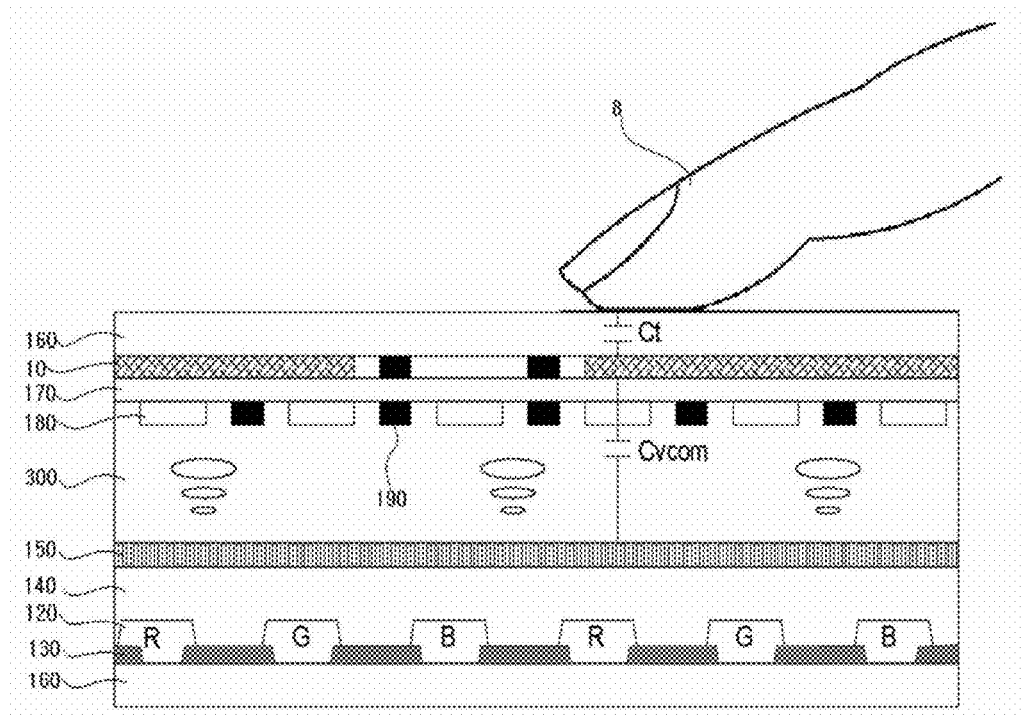
FIG. 10 is a diagram illustrating a concept of a formation of a touch capacitance Ct and a common electrode capacitance Cvcom in the display device integrated with a touch screen according to the present invention.

FIG. 10 is a diagram illustrating a use state of the display device integrated with a touch screen according to the present invention, in which if a finger or a touch input means 8 formed of a conductor similar to the finger contacts or approaches the display device, a touch capacitance Ct is formed between the sensor pattern 10 and the touch input means 8 and a common electrode capacitance Cvcom is formed between the sensor pattern 10 and a common electrode layer 150.

Further, the sensor pattern 10 according to the present invention has a matrix structure in which at least one column and at least one row are disposed and the respective sensor patterns 10 are preferably connected to a touch drive IC (TDI) by at least two sensor signal lines 22.

That is, when at least two sensor signal lines 22 are formed, even though one sensor signal line 22 is disconnected, a touch input signal can be transferred through the other sensor signal line 22, thereby stably maintaining the performance of the touch screen.

Figure 11:
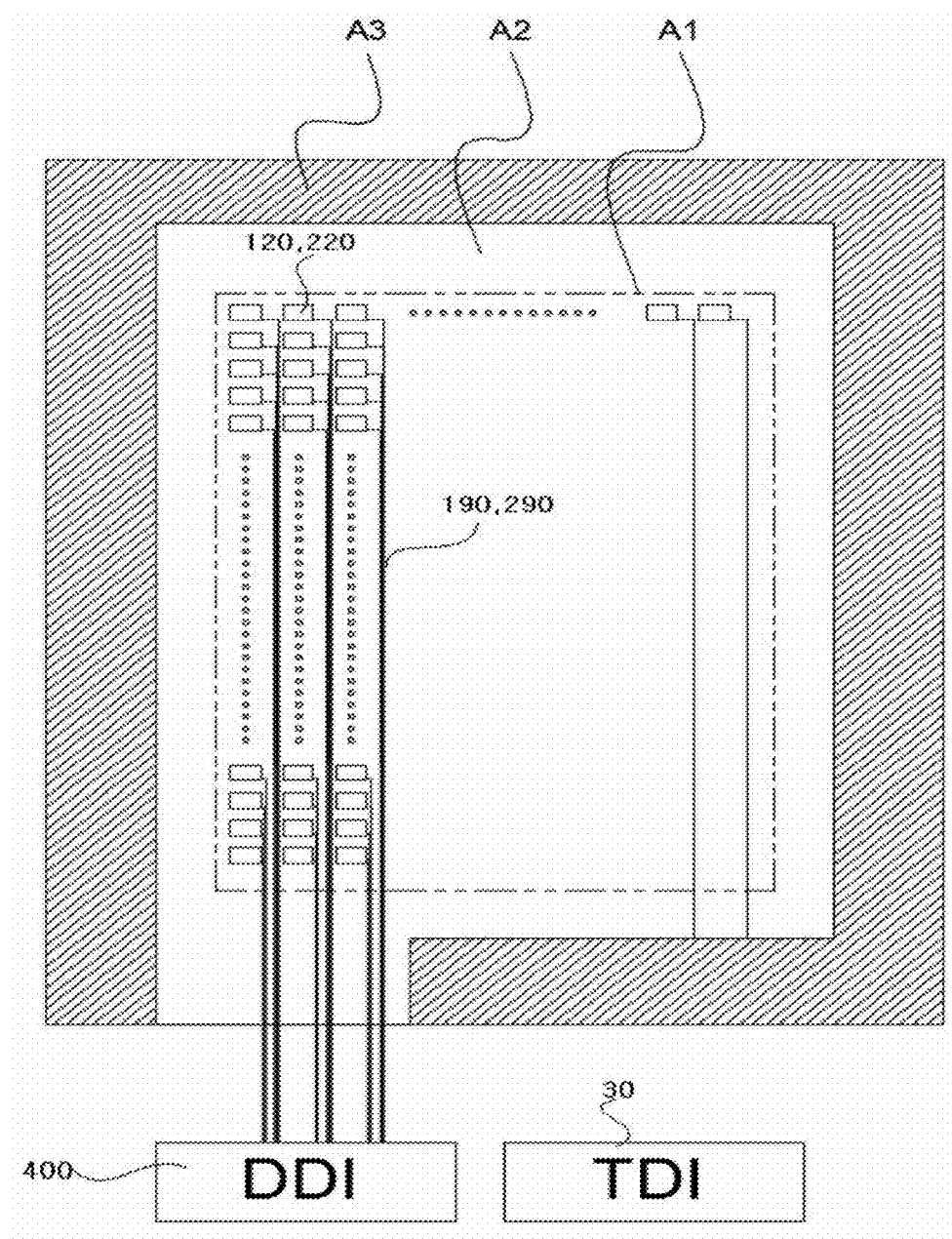
FIG. 11 is a diagram illustrating a connection state between each pixel electrode and a display drive IC (DDI) in the display device integrated with a touch screen according to the present invention.
Figure 12:
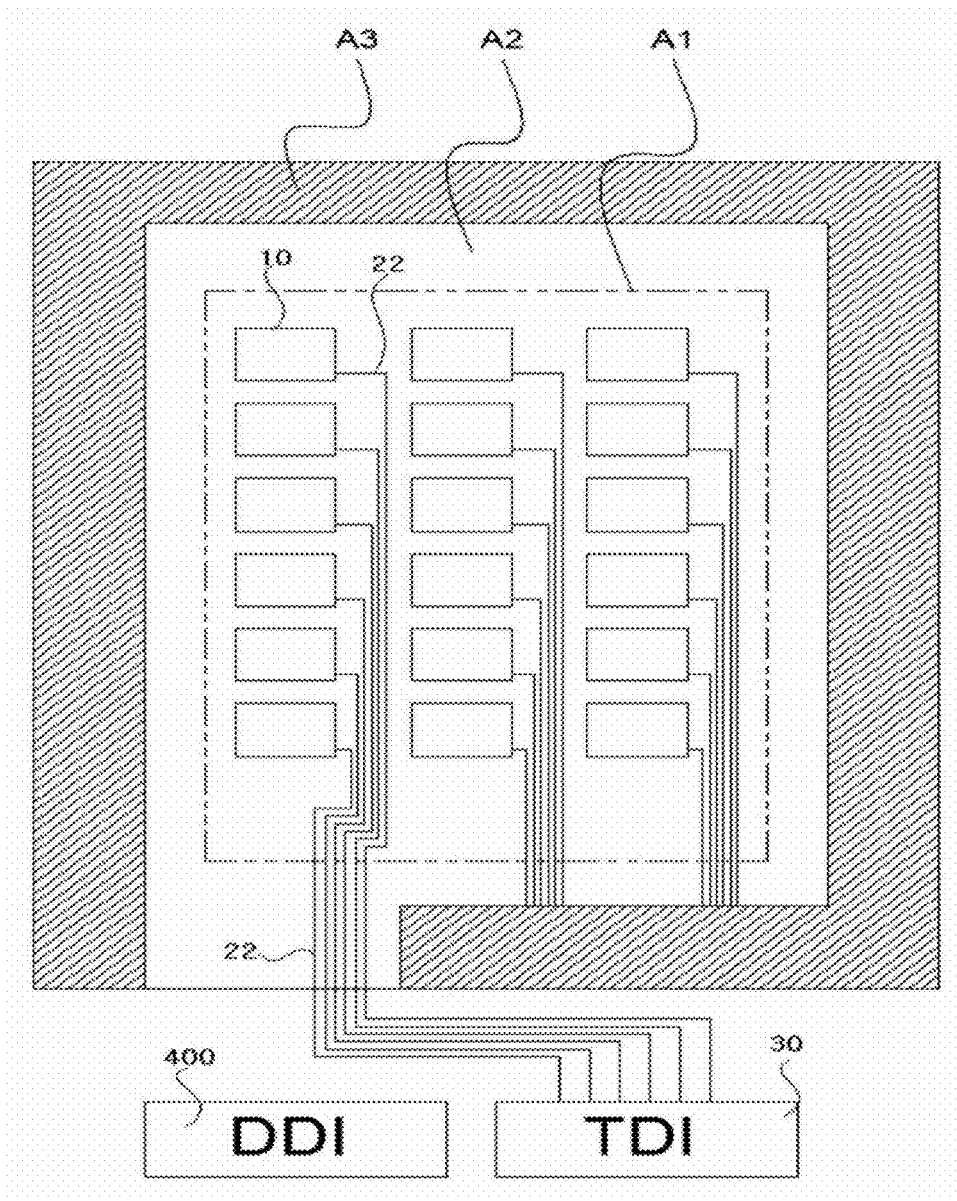
FIG. 12 is a diagram illustrating a connection state between each sensor signal line and a touch drive IC (TDI) in the display device integrated with a touch screen according to the present invention.

FIG. 11 is a diagram illustrating a connection state of the driving signal lines 190 and 290 and a display drive IC (DDI) and FIG. 12 is a diagram illustrating a connection state of the sensor signal line 22 and the touch drive IC (TDI), and it can be appreciated from these drawings that the sensor signal line 22 is disposed on the same line as the disposition area of the driving signal lines 190 and 290 and thus the sensor signal line 22 may be hidden in the display device.

In this case, the TDI 30 is positioned outside the DDI that drives the display device and may be driven in asynchronization with the DDI. According to another form, the TDI 30 is positioned inside the DDI and may be driven in synchronization with the DDI.

Figure 13:
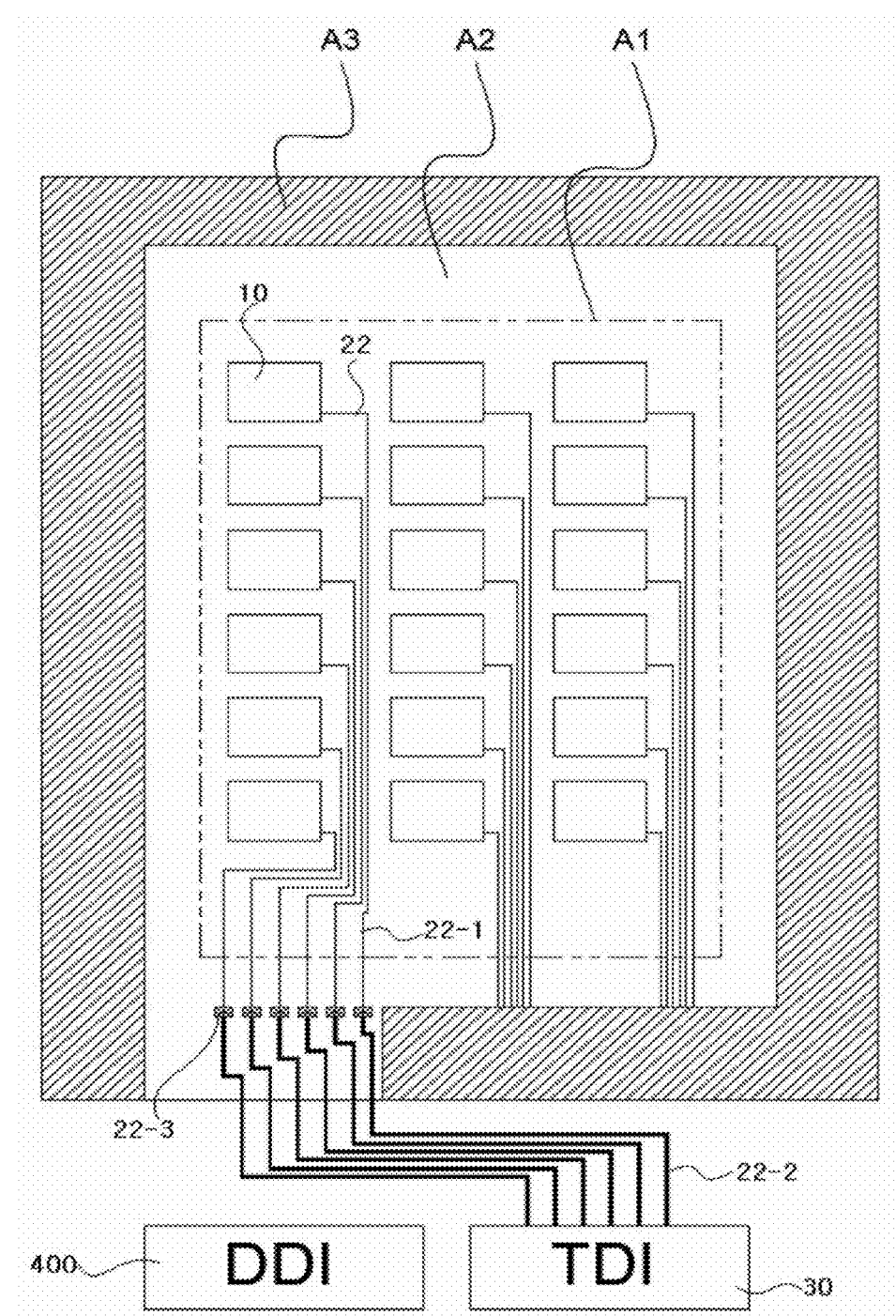
FIG. 13 is a diagram illustrating a concept of a transparent wiring and a metal wiring of the sensor signal line in the display device integrated with a touch screen according to the present invention.

Further, according to the present invention, as illustrated in FIG. 13, one side of the sensor signal line 22 is formed as a transparent wiring 22-1 made of a transparent conductive material and the other side thereof is formed as a metal wiring 22-2 made of a metal conductive material, in which the metal wiring 22-2 is preferably made of aluminum-based metal such as aluminum and aluminum alloy, silver-based metal such as silver and silver alloy, copper-based metal such as copper and copper alloy, molybdenum-based metal such as molybdenum and molybdenum alloy, chrome, titanium, tantalum, or the like. The metal wiring 22-2 may include two layers having different physical properties, that is, a lower layer (not illustrated) and an upper layer (not illustrated) thereon. The upper layer is made of metal having low resistivity to reduce a signal delay or a voltage drop, for example, aluminum-based metal such as aluminum (Al) and aluminum alloy. Differently from this, the lower layer is made of a material having excellent contact characteristics with indium tin oxide (ITO) and indium zinc oxide (IZO), for example, molybdenum (Mo) and molybdenum alloy, chrome (Cr), or the like. The transparent wiring 22-1 and the metal-wiring 22-2 that are formed on a heterogeneous layer are connected to each other through a contact hole 22-3.

As illustrated in FIG. 13, the signal line is formed as the transparent wiring 22-1 in a visible area A2 other than an active area A1, which is to maximally prevent the signal line in the visible area from being visualized by an observer. Further, signal lines in a light shielding area A3 are formed as the metal wiring 22-2 and the light shielding area A3 is an area that is hidden with black ink, or the like and a lower surface of the light shielding area A3 is not visualized by the observer. Therefore, to maximally lower the wiring resistance of the signal line, the metal wiring 22-2 is used in the light shielding area A3. Further, as illustrated, the metal wiring 22-2 and the transparent wiring 22-2 are connected to each other in the light shielding area A3 through the contact hole 22-3.

Figure 14:
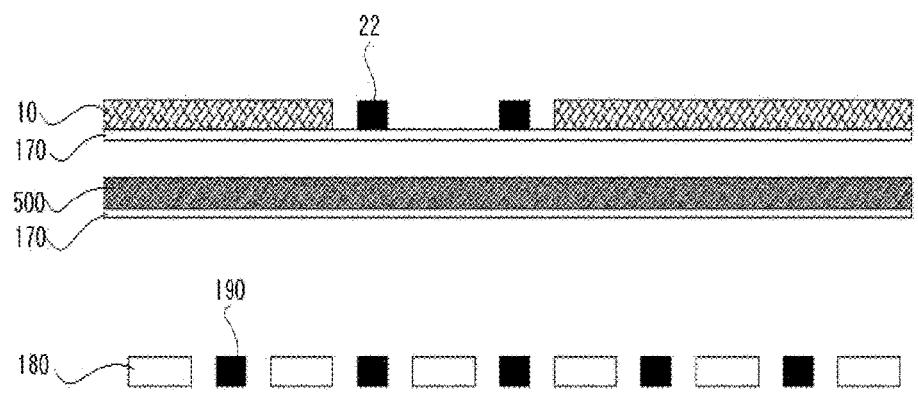
FIG. 14 is a diagram illustrating a display device integrated with a touch screen according to a third embodiment of the present invention to which a guard area is added.

FIG. 14 is a diagram illustrating a display device integrated with a touch screen according to a third embodiment of the present invention, and the display device according to the third embodiment of the present invention has the same configuration as the first embodiment. Here, in the second substrate, a guard area 500 is further formed between the touch sensor layer on which the sensor pattern 10 and the sensor signal line 22 are formed and a pixel electrode layer on which the pixel electrode 180 and the driving signal line 190 are formed.

In the display device having an in-cell structure, when the touch sensor layer and the pixel electrode layer are bonded to each other, there is a problem in that a parasitic capacitance is considerably increased. The display device integrated with a touch screen according to the present invention further includes the guard area 500 as a means for overcoming the above problem. At the time of forming the guard area 500, it is preferable that a first passivation layer 191 is further formed between the touch sensor layer and the guard area 500 and a second passivation layer 192 is further formed between the guard area 190 and the pixel electrode layer.

According to the present invention, the TDI 30 transfers the same driving signal to the touch sensor layer and the guard area 500. The driving signal of the present invention is a driving voltage Vdry and when the TDI 30 transfers the driving voltage Vdry to the touch sensor layer in a high state from a low state or in a low state from a high state, phases of the driving voltage transferred to the touch sensor layer and the guard area, respectively, may be the same or different.

Further, in addition to the driving voltage Vdrv, other signals generated from the TDI 30 may be forced.

The TDI 30 according to the present invention may drive the guard area 500 with one signal, but since the parasitic capacitance between the touch sensor layer and the pixel electrode layer is increased, driving capability of the TDI may be reduced.

Figure 15:
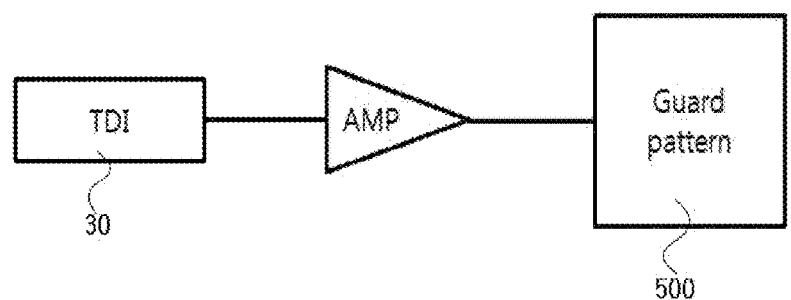
FIG. 15 is a diagram illustrating a concept of amplifying a driving signal of the TDI and transferring the amplified driving signal to the guard area in the display device integrated with a touch screen according to the present invention.

Therefore, as illustrated in FIG. 15, it is preferable that the TDI 30 further includes a driving signal amplifier that amplifies the driving signal transferred to the guard area 500, in which the driving signal amplifier is configured to include a buffer or an OP AMP and is formed in plural to be disposed in various forms, like being disposed over and under the guard area 500, respectively or disposed at left and right side over and under the guard area 500, respectively, or the like.

According to the third embodiment of the present invention, when the guard area 500 drives the touch sensor layer in a block unit, the guard area 500 of the area that is not sensed is not driven.

Figure 16:
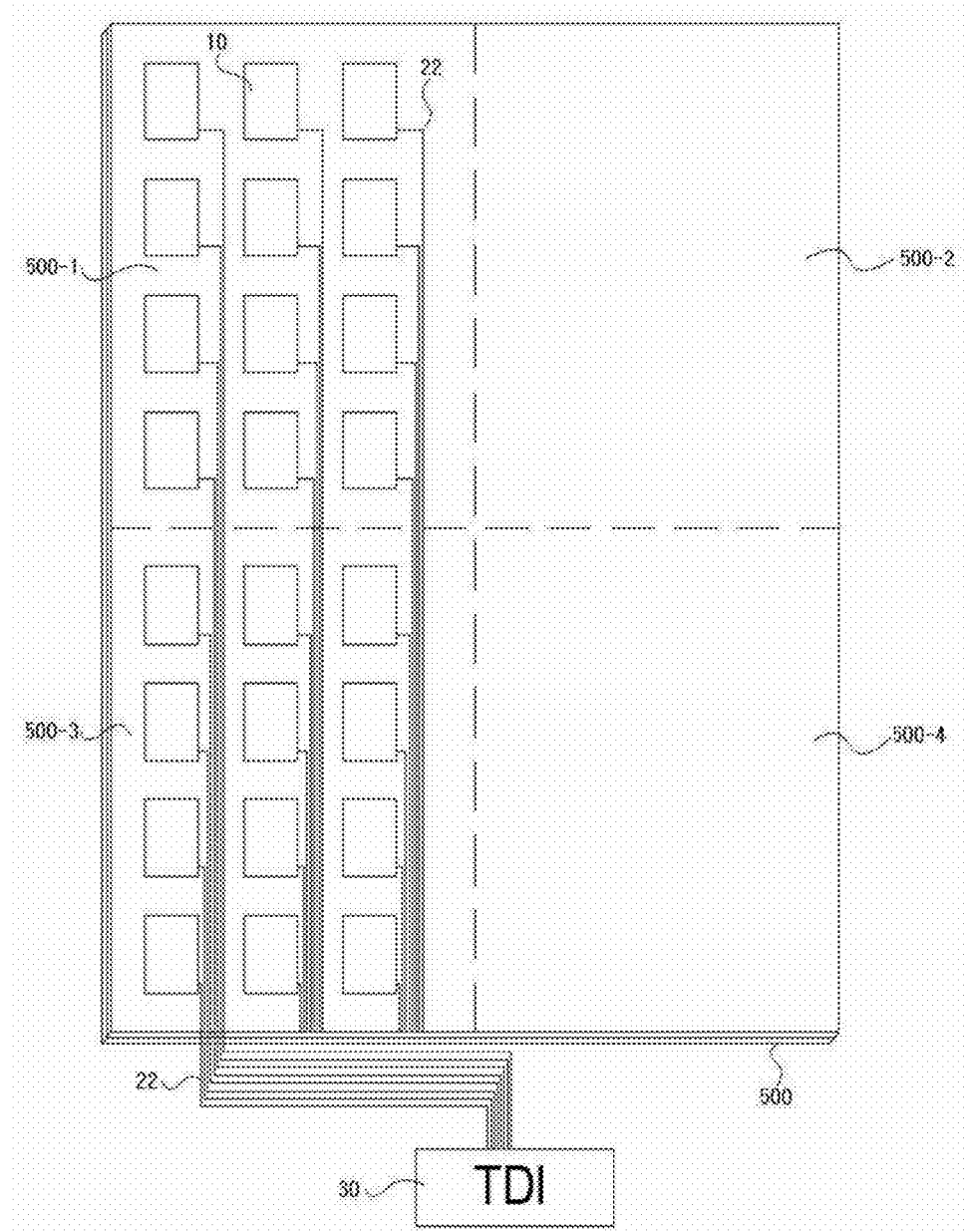
FIG. 16 is a diagram illustrating a concept of dividing the guard area in the display device integrated with a touch screen according to the present invention.

Therefore, as illustrated in FIG. 16, the guard area 500 according to the present invention is divided into a plurality of areas 500-1 to 500-4, and it is preferable that each of the divided areas 500-1 to 500-4 is selectively driven while matching a block driving area of the touch sensor layer and the driving signal amplifiers are also disposed in each of the divided areas.

The TDI 30 according to the present invention detects a touch signal using the driving back phenomenon when the touch capacitance Ct is added to a driving capacitor Cdrv depending on whether a touch is generated by the touch input means.

Further, the TDI according to the present invention includes a driving capacitor Cdrv whose one terminal is connected to the sensor pattern and the other terminal is applied with a driving voltage for touch detection, a common voltage detector detecting a common voltage generated from the display device, a driving voltage generator generating the driving voltage Vdry in synchronization with the common voltage, and a touch detector connected to the sensor pattern and detecting the touch signal using the driving back phenomenon when the touch capacitance Ct is added to the driving capacitor Cdrv depending on whether the touch is generated by the touch input means.

Unlike the existing touch detection means that is based on a scheme of detecting a size of capacitance by a contact of a finger, or the like, the TDI is based on the scheme of detecting the driving back phenomenon generated due to the difference in the size of touch capacitance when the alternating driving voltage is applied to the added driving capacitor. The touch detection system according to the present invention compares the magnitude of voltage generated by the driving back phenomenon occurring due to a driving capacitor and the common electrode capacitance and the parasitic capacitance when the touch is not generated and the magnitude of the voltage generated by the driving back phenomenon when the touch capacitance is added by the touch generation and extracts the difference between the magnitudes of the two voltages, thereby minimizing the effect due to the outside noise, the parasitic capacitance, or the like and more stably acquiring the touch signal.

The display device described in the present invention means any one of LCD, PDP, and OLED or means all other means displaying images.

Among the display devices listed above, the LCD requires a common voltage Vcom to drive a liquid crystal. For example, a small and medium portable LCD uses a line inversion scheme in which a common voltage of a common electrode alternates in one gate line or each of the plurality of gate lines, to thereby reduce current consumption. As another example, in the case of a large LCD, a common voltage of a common electrode has a constant DC level and the LCD uses a dot inversion driving scheme. As another example, in the case of an in-plane switching mode LCD, a common electrode is formed in a part of an area of an LCD TFT substrate and thus an image is displayed by a line inversion or a dot inversion driving scheme. In the case of the in-plane switching mode LCD, a back ground is commonly formed over the whole of a color filter exposed to the outside through a back indium tin oxide (ITO) and is grounded to a ground signal to cut off electrostatic discharge (ESD).

According to the embodiment of the present invention, in addition to the electrode to which the common voltage Vcom is applied as described above, all electrodes commonly acting within the display device are referred to as the "common electrode" and an alternating voltage or a DC voltage applied to the common electrode of the display device or a voltage alternating at a unspecific frequency is referred to as the "common voltage".

Further, in the present specification, "forcing a signal" means that a level of a signal which already keeps any state is changed or a connection to any signal in a floating state. For example, forcing the signal to an on/off control terminal of the switching element may mean that the existing low level voltage is changed to a high level and any voltage is applied to the on/off control terminal of the switching element in the floating state to turn on/off the switching element without any signal.

Further, in the present invention, the "driving back phenomenon" and the "driving back" are used as the same meaning and are contracted to "D/B".

Further, in the present specification, the touch drive IC is contracted to TDI.

Further, in the present invention, when the touch is not generated, the voltage by the D/B is detected and when the touch is generated, the voltage by the D/B is also detected, and thus the use of the relationship between the two voltages determines whether the touch is generated and a contact area of the touch means, such that the meaning that the voltage is detected by the D/B phenomenon is identical with the meaning that the touch signal is detected.

Figure 17:
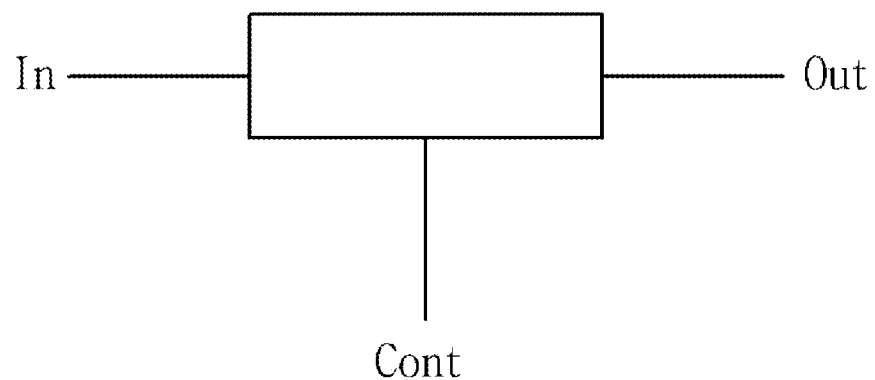
FIGS. 17 to 24 are diagrams illustrating a touch detection content using a driving back phenomenon of the display device integrated with a touch screen according to the present invention.

FIG. 17 is a diagram conceptually illustrating a three-terminal switching element among switching elements used as one example of a charging means in the present invention. Referring to FIG. 17, the three-terminal switching element generally includes three terminals of an on/off control terminal Cont, an input terminal In, and an output terminal Out. An on/off control terminal is a terminal for controlling an on/off of the switching element. When a predetermined magnitude of voltage or current is applied to the terminal, the voltage or the current applied to the input terminal is output to the output terminal in a voltage or current form.

According to an embodiment of the present invention, the three-terminal switching element mentioned as the charging means may be, for example, a relay, a complementary metal oxide semiconductor (CMOS) switch, a PMOS or NMOS, a bipolar junction transistor (BJT), a field effect transistor (FET), a metal oxide semiconductor field effect transistor (MOSFET), an insulated gate bipolar transistor (IGBT), a thin film transistor (TFT), and an OPAMP and may be formed by homo-coupling or hetero-coupling therebetween.

As the relay, in addition to the three-terminal element, a four-terminal element may also be used. As the charging means that may be used in the present invention, any element that has a control terminal that may turn on/off the input and output regardless of the number of input and output terminals and turns on/off the input and output by the on/off control terminal may be used.

Meanwhile, as an example of the three-terminal switching element, the CMOS switch is configured of a combination of PMOS and NMOS, in which input and output terminals are connected to each other but on/off control terminals are individually present to be connected to the same control signal together or be separately connected to an individual control signal to thereby determine an on/off state. The relay is an element which outputs a voltage or a current applied to an input terminal when a current is applied to a control terminal and the BJT is an element which makes a current amplified by a predetermined amount flow from a collector to an emitter when a current flows in a base terminal in a state in which a voltage higher than a threshold value (threshold voltage) of a base is applied to a base. Further, a TFT is a switching element which is used in a pixel unit configuring a display device such as an LCD and an AMO-LED and is configured to include a gate terminal which is a control terminal, a source terminal which is an input terminal, and a drain terminal which is an output terminal. Here, when a voltage which is larger by a threshold value than a voltage applied to a drain terminal is applied to the gate terminal, the TFT is a device which is conducted and thus makes a current depending on a magnitude of voltage applied to the gate terminal flow from the input terminal to the output terminal.

Figure 18:
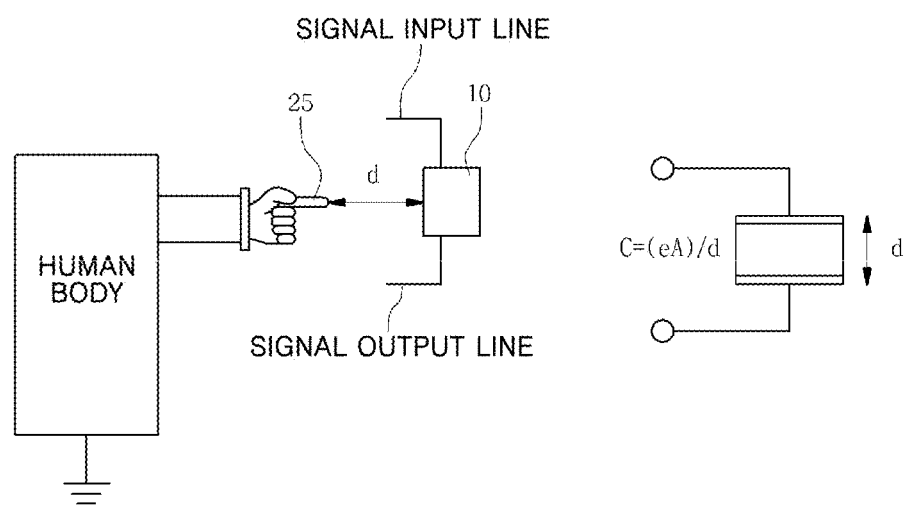

Prior to describing the detailed embodiment of the present invention, a principle of detecting a touch input according to the present invention will be briefly described with reference to FIG. 18. In the example of FIG. 18, it is assumed that the sensor pattern 10 and the finger 25 are spaced apart from each other at an interval of "d" and have an opposing area "A" when the finger 25 or the conductive touch means similar thereto approaches the sensor pattern 10. Then, as illustrated in the right equivalent circuit of FIG. 18 and Equation, a capacitance "C" is formed between the finger 25 and the sensor pattern 10. When the voltage or current signal is supplied to the signal input line of the sensor pattern 10 having the capacitance "C" and charges having a size of charge quantity "Q" are accumulated in the capacitor having a size of the capacitance "C", the capacitor may accumulate charges based on the relation Equation V=Q/C. When the driving back having the relationship with the size of the capacitance "C" is generated in the sensor pattern 10 connected to the touch detector, the present invention detects the touch using the driving back.

Figure 19:
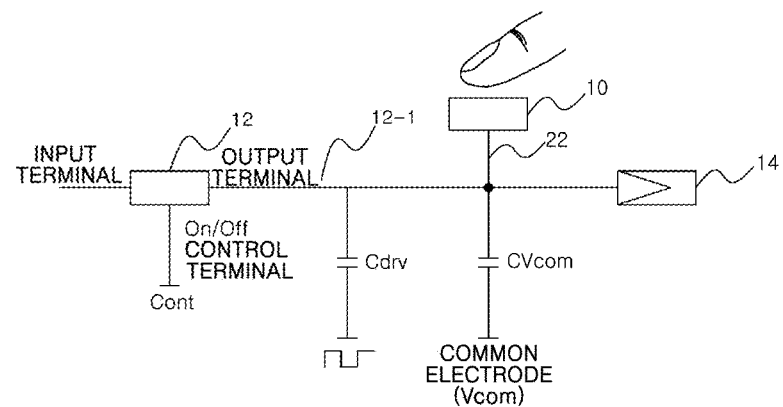

FIG. 19 is a circuit diagram illustrating a basic structure of a touch detecting means according to an embodiment of the present invention. Referring to FIG. 19, a specialized touch detection means according to the embodiment of the present invention has a basic structure configured of the charging means 12, the sensor pattern 10, the sensor signal line 22, the driving capacitor Cdrv, a common electrode capacitor Cvcom, and the touch detector 14.

The charging means 12 supplies a precharge signal to the sensor pattern 10 and is turned off by a turn off signal forced to the "on/off control terminal" named "Cont" to make an output terminal 12-1 into a high impedance.

The precharge signal is a voltage charging these capacitors by applying a DC voltage to all the capacitors connected to the output terminal 12-1 of the charging means 12 prior to detecting the touch signal. Therefore, the charging means 12 is a switching element that performs the switching operation depending on the control signal supplied to the on/off control terminal or a linear element such as an OPAMP supplying a signal depending on the control signal.

Like the embodiment of FIG. 19, when the three-terminal switching element is used as the charging means 12, the appropriate charging voltage may be supplied to the sensor pattern 10 and all the capacitors such as the driving capacitor Cdrv and the common electrode capacitor Cvcom that are connected to the output terminal 12-1 of the charging means 12 at required time by using the control signal supplied to the on/off control terminal and the signal supplied to the input terminal. As the charging voltage, a DC voltage including zero voltage and an alternating AC voltage like a square wave, a triangle wave, or a sine wave may be used.

The charging voltage has the relationship with the voltage used in the touch drive IC (hereinafter, TDI) in which the touch detection system according to the present invention is integrated. The relationship will be described with reference to, for example, FIGS. 20A and 20B.

Figure 20A:
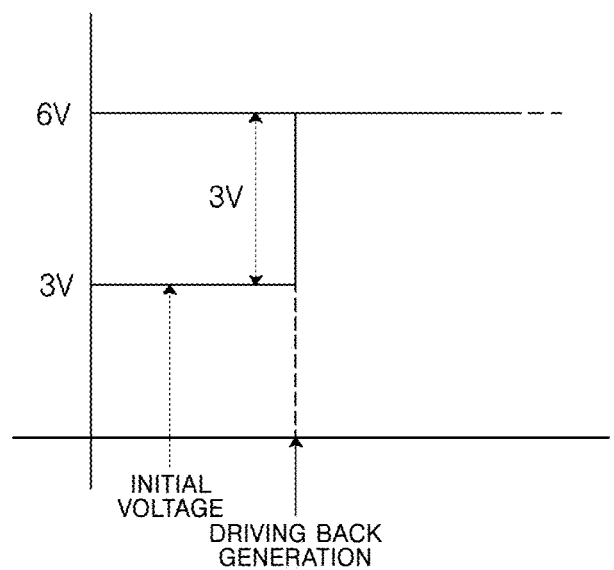

An internal voltage of the TDI is 5 V. If it is assumed that the TDI is damaged when a voltage equal to or more than 5 V is supplied to the TDI, an operating voltage of the circuit operated in the TDI does not exceed 5 V. Like the embodiment of FIGS. 20A and 20B, it is assumed that a potential difference due to the D/B to be described below is 3 V. In this case, as illustrated in FIG. 20A, if the voltage of the output terminal 12-1 of the charging means 12 is 3 V before the D/B is generated, the voltage of the output terminal 12-1 of the charging means by the D/B is 6 V, which exceeds 5 V that is the internal voltage of the TDI and therefore the TDI 30 is put in a damage area.

Figure 20B:
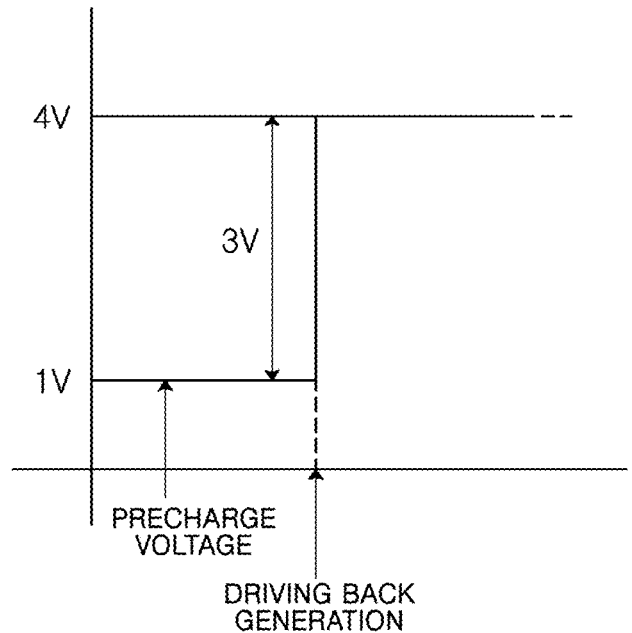

To solve the above problems, as illustrated in FIG. 20B, if all the capacitors connected to the output unit of the charging means are charged with 1 V by applying 1 V to the input unit of the charging means in the state in which the charging means is in a turned on state, even though the potential difference of 3 V is generated by the above-mentioned driving back, the potential of the output terminal 12-1 is 4 V, and therefore the TDI 30 is operated in a safety area.

As such, the embodiment of the present invention may include a function of controlling a charging voltage adjusting a magnitude of maximum voltage based on the internal voltage of the TDI at the time of the generation of the driving back.

Figure 21:
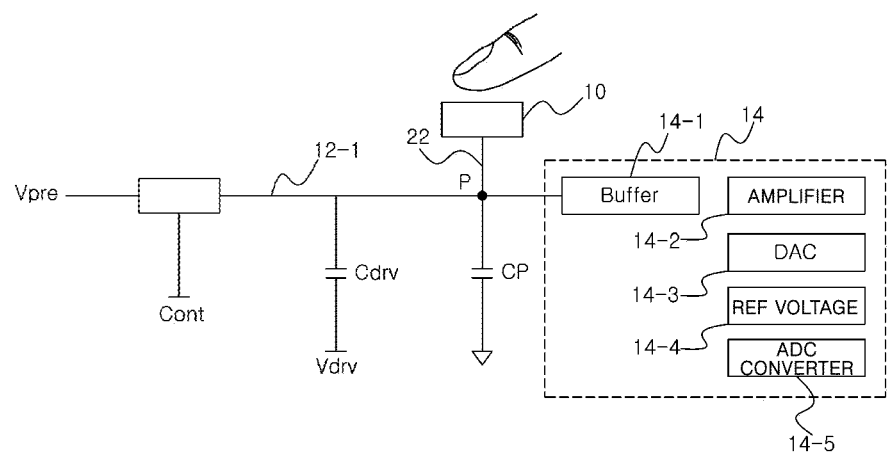

FIG. 21 illustrates a configuration of the touch detector 14 according to the embodiment of the present invention. Referring to FIG. 21, the output terminal 12-1 of the charging means 12 and all the capacitors connected to the output terminal 12-1 are connected to the touch detector 14. The D/B phenomenon to be described below occurs in the capacitor connected to the output terminal 12-1 of the charging means 12, and therefore the voltage generated by the D/B is applied to a buffer 14-1 of the touch detector 14. An input terminal of the buffer 14-1 is generally high impedance (hereinafter, referred to as Hi-z), and therefore if the output terminal 12-1 of the charging means is in the Hi-z, all the capacitors connected between the output terminal 12-1 of the charging means and the buffer 14-1 also become the Hi-z state. The present embodiment illustrates that the output terminal 12-1 of the charging means is directly connected to the buffer 14-1, but may be connected to terminals of all elements of which the inputs are in the Hi-z state, such as a gate of a MOS and a gate of a TFT, instead of the buffer 14-1. The reason of making the output terminal 12-1 of the charging means and the touch detector 14 into the Hi-z is that only when the D/B phenomenon to be described below is detected in the Hi-z state and the detecting time may be long. That is, since there is no discharge path of isolated charges in the Hi-z state, a level of the voltage generated by the D/B is maintained for a long time while being minimally changed.

The signal output from the buffer 14-1 is input to an amplifier 14-2. If an input terminal of the amplifier 14-2 is the Hi-z, point P of FIG. 21 may be directly connected to the input terminal of the amplifier 14-2.

When a level of a signal at the point P is low and thus needs to be amplified, the signal may be amplified by various amplifiers. However, it is preferable to use a differential amplifier. The reason is that the point P is charged with a precharge voltage (or charging voltage) to be described below and the charging voltage may be removed by the differential amplifier during the amplification process and only the voltage generated by the D/B phenomenon at the point P may be amplified.

To remove a DC offset like the charging voltage when the differential amplifier is used, a DC voltage needs to be applied to a negative terminal of the differential amplifier. To apply the DC voltage, a DAC 14-4 needs to be used or a "Ref voltage" 14-5 needs to be used, in which the Ref voltage is a DC voltage having a predetermined potential as a voltage reference and is generated in a power supply unit 47 to be described below in FIG. 23.

FIG. 21 illustrates that only one ADC corresponding to one sensor pattern 10 is used, but if a plurality of touch detection circuits as illustrated in FIG. 21 are used, a plurality of ADCs may also be used and as the number of used ADCs is increased, a calculation time of a signal may be reduced.

Although not illustrated in FIG. 21, a filter may be used among several function units which are displayed in the touch detector 14. For example, a filter may also be used in a previous stage of the buffer 14-1 and a filter may be used in a previous stage of the amplifier 14-2 or even in an amplifier stage. As the filter, various filters such as a bandwidth low pass filter, a bandwidth high pass filter, a grass cut filter (GCF), a ranking filter, and an average filter using chopping may be used.

The sensor filter 10 is made of a transparent conductor or metal. When the sensor pattern 10 is installed on a display device and is made of a transparent conductor, the transparent conductor may be transparent conductive materials such as indium tin oxide (ITO), antimony tin oxide (ATO), carbon nano tube (CNT), and indium zinc oxide (IZO) or transparent materials having conductive properties similar thereto. If the sensor pattern 10 is used as touch keyboard which is not used along with the display device and a touch key of a refrigerator or a monitor, the sensor pattern 10 may also be made of a non-transmitting material such as metal.

The sensor pattern 10 may be patterned in various forms. For example, the sensor pattern 10 may be a dot matrix form in which isolated islands in an active area of a touch screen 50 are arranged in a matrix form or linear patterns may be arranged to cross the touch screen 50. The form of the sensor pattern 10 will be described in detail in the embodiment to be described below.

The sensor signal line 22 is a signal line that connects polarity of the capacitor formed when the finger 25 or the touch means (for example, like a touch pen, or the like) having conductive characteristics similar thereto approaches the sensor pattern 10 to the touch detector 14 and may be formed of a transparent conductive material like the sensor pattern 10 and may also be formed of a non-transmitting material such as metal in some cases. The detailed embodiment of the sensor signal line 22 will be described in the embodiment to be described below.

The driving capacitor Cdrv is a component for applying the driving voltage for touch detection according to the present invention and one terminal thereof is connected to the touch detector 14 and the other terminal thereof is applied with the driving voltage and the D/B phenomenon is generated by the driving voltage.

As illustrated in FIG. 19, the output terminal 12-1 of the charging means 12 is connected to the touch detector 14. Further, one terminal of the driving capacitor Cdrv is connected to the output terminal 12-1 of the charging means 12 and the other terminal of the driving capacitor Cdrv is applied with a detection signal. The detection signal is a voltage of which a plurality of different potentials alternate and is a periodic or aperiodic waveform such as a square wave, a sine wave, and a triangle wave and is detected by allowing the touch detector 14 or the sensor pattern 10 to induce the D/B voltage in proportion to the magnitude of alternating driving voltage. The detected D/B voltage is detected at an intersecting point among the touch detector 14, the sensor pattern 10, and the output terminal 12-1 of the charging means 12, and therefore throughout the present specification, the meaning that the D/B signal is detected at the sensor pattern 10, the touch detector 14, or the output terminal 12-1 of the charging means 12 is the meaning that the D/B signal is detected at the same position.

The common electrode capacitor Cvcom of FIG. 19 is a capacitance formed when the sensor pattern 10 is opposite to the common electrode of the display device and one terminal thereof is connected to the touch detector 14 and the other terminal thereof is applied with the common voltage. The common voltage may be directly applied to the common electrode capacitor or indirectly applied by being electromagnetically induced through vehicles such as glass and air.

Figure 22:
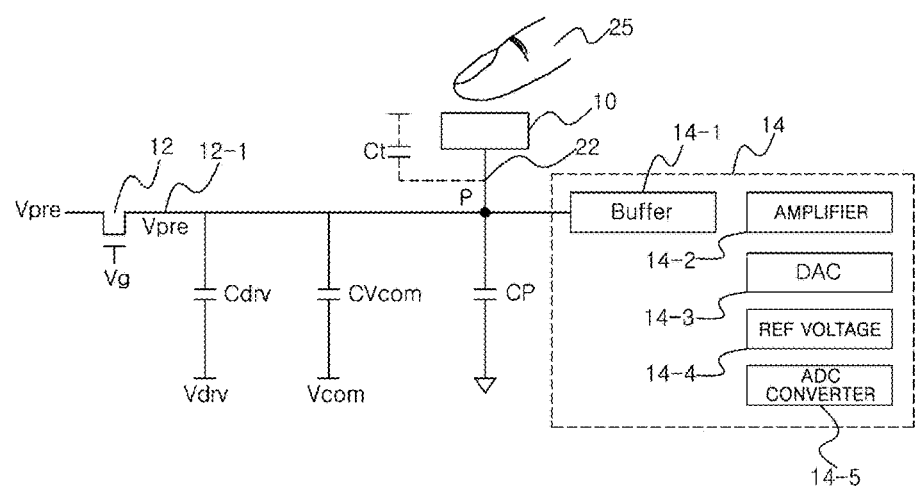

FIG. 22 illustrates the case in which the MOS, the TFT, or the FET is used as one example of the switching element and an analog to digital converter (ADC) is used in the touch detector 14. The ADC performs a function of converting the detected analog signal into a digital signal and a function of converting the touch signal detected in the present embodiment into a digital signal and transferring the digital signal to a signal processor 35 or a CPU 40 of FIG. 23.

As illustrated in FIG. 22, when the finger 25 of the human body approaches the sensor pattern 10 at a predetermined interval, the touch capacitance "Ct" is formed between the finger 25 and the sensor pattern 10. The Ct is a value set by the relation Equation of FIG. 18, and may be freely adjusted by adjusting the interval between the touch means and the sensor pattern 10, the opposing area, or the like. For example, if the area of the sensor pattern 10 is formed to be large, the Ct is also formed to be large depending on the relation Equation of FIG. 18. On the contrary, as the area of the sensor pattern 10 is formed to be small, the Ct is formed to be small. According to one embodiment, the Ct may be designed to have several femto Farad (fF) to tens of micro Farad (µF).

Figure 23:
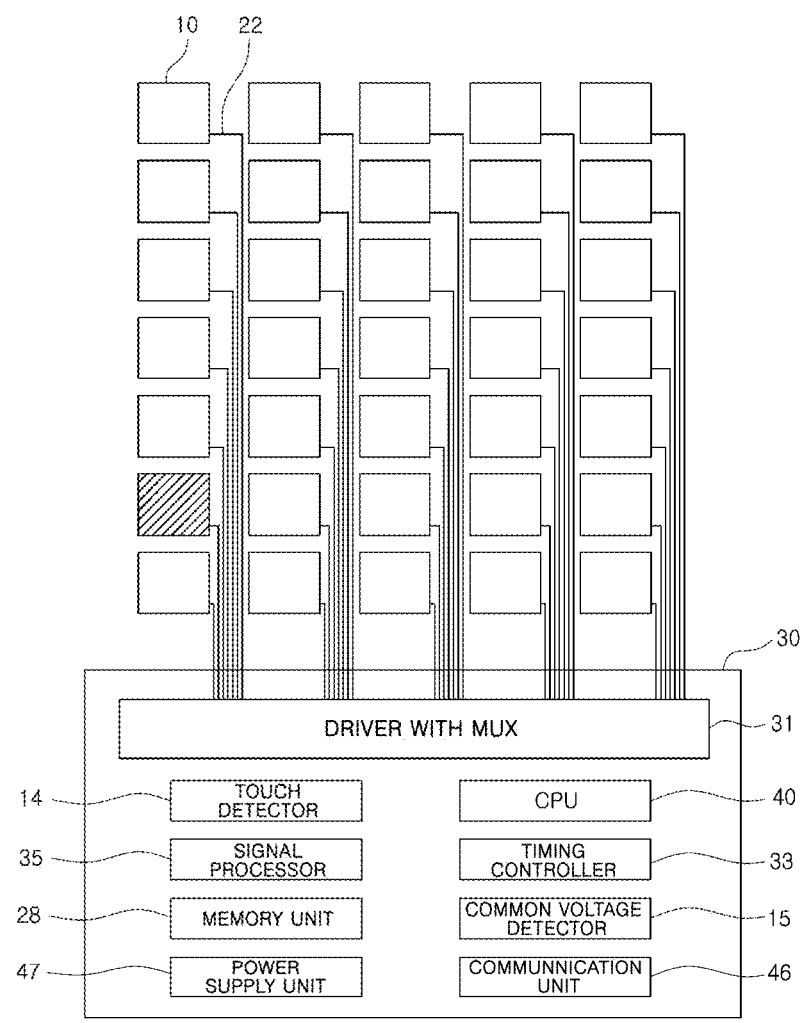

The Cp of FIG. 22 is a parasitic capacitor and is formed by the Equation like the Ct or is a total sum of the capacitor values other than the capacitor that may be manufactured like the Cdrv and may be modeled by a capacitor whose one terminal is connected to the touch detector 14 and the other terminal is connected to any ground. Therefore, the plurality of parasitic capacitors Cp whose grounds are different may be formed, but the present specification illustrates only one parasitic capacitor connected to only one ground under the assumption that the ground is one. As the parasitic capacitor Cp, there are various forms of parasitic capacitors such as a parasitic capacitor generated between the sensor signal line 22 and the display device, a parasitic capacitor generated between the sensor signal lines 22 when the sensor pattern 10 is installed in plural in the dot matrix form as illustrated in FIG. 23 and thus the sensor signal lines 22 connected to the sensor patterns 10 are disposed in parallel with each other, a parasitic capacitor generated at a connection part when the TDI is connected to the sensor pattern 10, a parasitic capacitor occurring due to an interference of the circuit unit connected to the sensor signal line within the TDI with peripheral circuits, or the like. Depending on <Equation 1> or <Equation 2> to be described below, the parasitic capacitors serve to lower the D/B signal by being inserted into a denominator of the Equation, and therefore as the number of parasitic capacitors is reduced, it is advantageous in the touch detection.

Referring back to FIG. 22, the precharge voltage Vpre is applied to the input terminal of the charging means 12 and when the switching element is turned on by a control voltage Vg applied to the on/off control terminal cont, the precharge voltage Vpre is output through the output terminal 12-1. Therefore, all the capacitors connected to the output terminal 12-1 of the charging means 12 are charged with the precharge voltage Vpre.

According to the embodiment, if the switching element is turned on when the Vpre is 3 V and the Vg is changed from zero voltage to 10 V, the potential of the touch detector 14 to which the driving capacitor Cdrv, the touch capacitor Ct, and the parasitic capacitor Cp are connected after the switching element is turned on is 3 V. If the point P is charged and then the control voltage Vg of the switching element drops from 10 V to 0 V to turn off the switching element, the point P that is the touch detector becomes the Hi-z and thus the charges of the point P are isolated and if the alternating driving voltage is applied to the driving capacitor Cdrv, the magnitude of voltage detected at the point P is proportional to the magnitude of driving voltage and the driving back phenomenon having the relationship with the sizes of the capacitors connected to the point P is generated.

In this case, if it is assumed that the Cdrv, the Cp, and the Cvcom are a fixed value and the magnitude of the driving voltage applied to the driving capacitor Cdrv is constant, the magnitude of the voltage detected by the D/B phenomenon at the point P relies on the touch capacitor Ct. Therefore, if the voltage detected by the touch detector 14 is changed depending on the size of the touch capacitor Ct and therefore the difference in the driving voltage due to the driving back phenomenon is detected, it is possible to determine whether the touch is generated and calculate the opposing area (or touched area) of the sensor pattern 10 and the touch means 25 and find the touched point.

Referring back to FIG. 22, the touch capacitance Ct and the Cdrv formed between the sensor pattern 10 and the conductor like the finger 25, the Cvcom, and the Cp fare connected to the output terminal 12-1 of the charging means 12. Therefore, if the precharge signal of any voltage, current, or the like is applied to the input unit 12-2 in the state in which the charging means 12 is turned on, the Cdrv, the Ct, the Cvcom, and the Cp are charged with a precharge level, and thus the potential of the input terminal of the touch detector 14 becomes the precharge level. Next, when the charging means 12 is turned off, the signals charged in four capacitors keep the precharge (or charging) signal level as long as it is not separately discharged.

To stably isolate the charged signal, the output terminal 12-1 of the charging means 12 and the input terminal of the touch detector 14 are in the Hi-z state. Preferably, the output terminal 12-1 of the charging means 12 and the input terminal of the touch detector 14 may have the impedance of at least 210 Kohm. If the touch input is observed while the signals charged in four capacitors are discharged, the charged signal by other means is isolated, or the signal is quickly observed at the time of the discharge starting timing, the input terminal of the touch detector 14 is not necessarily Hi-z.

The touch detector 14 detects whether the signal level of the sensor pattern 10 is changed. Preferably, the touch detector 14 detects the difference in the magnitude of the voltage detected by the D/B phenomenon when the touch is generated (that is, when the Ct is formed), compared with the magnitude of the voltage detected by the D/B phenomenon when the touch is not generated (that is, when the Ct is not formed), thereby acquiring the touch signal. The touch detector 14 may have various elements or circuit configurations. The embodiment to be described below describes the example in which the switching element and the amplifier as the touch detector 14 are used but the configuration of the touch detector 14 is not limited to the embodiment.

The output of the driving capacitor Cdrv and the buffer 14-1 by the driving voltage applied to one terminal of the driving capacitor Cdrv when the touch is not generated is determined by the following <Equation 1>.

$$\Delta Vsensor = Vpre \pm (Vh - Vl)\frac{Cdrv}{Cdrv + Cvcom + Cp} \quad \langle\text{Equation 1}\rangle$$

When the touch is generated, the touch capacitance Ct is added to the touch detector 14 in parallel, and therefore the voltage detected by the driving back at the input terminal of the touch detector 14 is determined by the following <Equation 2>.

$$\Delta Vsensor = Vpre \pm (Vh - Vl)\frac{Cdrv}{Cdrv + Cvcom + Cp + Ct} \quad \langle \text{Equation 2} \rangle$$

In the above <Equation 1> and <Equation 2>, ΔVsensor represents a voltage generated by the D/B at the input terminal of the touch detector 14, Vpre represents the precharge voltage, Vh represents a high level voltage of the driving voltage applied to the driving capacitor Cdrv, V1 represents a low level voltage of the driving voltage applied to the driving capacitor Cdrv, Vcom represents the common electrode capacitance, Cp represents the parasitic capacitance, and the Ct represents the touch capacitance.

FIG. 23 is a configuration diagram illustrating a touch screen according to an embodiment of the present invention. FIG. 23 is an embodiment in which the touch detection means as illustrated in FIG. 21 or 22 is applied and illustrates the example in which the sensor patterns 10 are arranged in the dot matrix form.

A lower portion of FIG. 23 is provided with the configuration of the TDI 30. The TDI 30 may include a driver 31, the touch detector 14, a timing controller 33, a signal processor 35, a memory unit 28, a common voltage detector 15, the power supply unit 47, and a communication unit 46 and may further include the CPU 40. The CPU 40 is a microprocessor having an operation function and may also be positioned outside the TDI 30.

The touch screen 50 is provided with the sensor pattern 10 and the sensor signal line 22 by patterning. The sensor pattern 10 is made of ITO or IZO that is the transparent conductor, a carbon nano tube (CNT), or the like and may have a square, a circle, a triangle, a star shape, or a fractal shape without the limitation of the shape. The sensor pattern 10 and the sensor signal line 22 are formed of the same element and if the sensor pattern 10 is made of ITO, the sensor signal line 22 is also made of ITO. The method may pattern the sensor pattern 10 and the sensor signal line 22 with a sheet of mask and the touch screen 50 of the present invention may be manufactured in a single layer by a sheet of mask.

Since another sensor pattern 10 or sensor signal line 22 does not pass over or under the sensor pattern 10 or the sensor signal line 22, the touch screen 50 of the present invention using the single layer may reduce the thickness of the touch screen 50, improve transmittance, and save costs due to improvement in yield.

Referring back to FIG. 23, the driver 31 includes the charging means 12 and the driving capacitor Cdrv like the embodiment of FIG. 22. Further, the common voltage detection circuit is present. Depending on the above <Equation 1> or <Equation 2>, the difference in the magnitude of the detected voltage is generated by the size of the Cdrv, and therefore a means that may change the size of the Cdrv needs to be included in the TDI. As the size of the Cdrv is increased, the size of the detected voltage is getting larger, which means that the detection sensitivity is good. However, when the size of the Cdrv is too increased, the volume of the TDI is increased, which is a factor of incurring the increase in price of the TDI. Therefore, the size of the Cdrv needs to be designed at an appropriate size. To adjust the size of the Cdrv, a register for adjusting the size is installed in the TDI. The register has a plurality of addresses and different Cdrv values are mapped to each address. The Cdrv corresponding to the selected value of the register is connected to the touch signal detection circuit included in the touch detector 14.

According to the embodiment of FIG. 23, the sensor pattern 10 consists of 35 that is 5 (breadth)×7 (length) and when the sensor pattern 10 is positioned on the upper surface of A/A of the display device, the A/A is divided into 35 touched areas. This is only one embodiment and more than 100 sensor patterns 10 may be installed on the actual touch screen 50. If the detection circuit units 14 as illustrated in FIG. 22 that one to one correspond to many sensor patterns 10 are present in the driver 31 of the TDI 30, the area of the TDI is wide, which is a factor of increasing price. Therefore, a small number of detection circuit units 14 are installed in the driver and the sensor pattern 10 may be multiplexed by a time division method to detect the touch signal.

For example, one detection circuit unit 14 illustrated in FIG. 22 is installed in the driver 31. The sensor patterns 10 are connected to the charging means 12, the detection circuit unit 14, and the touch signal detection circuit connected to the capacitors connected thereto by being sequentially multiplexed one by one. That is, since the number of touch signal detection circuit units is only one but the number of sensor patterns 10 is 35, a multiplexer that has 35 inputs and selects one of the 35 inputs and connects the one input selected to the detection circuit needs to be designed.

According to another embodiment, the plurality of touch signal detection circuit units 14 are installed in the driver 31. However, the plurality of touch signal detection circuit units 14 are installed to be fewer than the number of sensor patterns 10 and in the embodiment of FIG. 23, 5 or 7 touch signal detection circuit units 14 are installed. When the 5 touch signal detection circuit units are installed, the touch signals of the 5 sensor patterns 10 may be simultaneously detected, one to one corresponding to the 5 sensor patterns 10 installed in a horizontal direction, and therefore the touch signals of all the 35 sensor patterns 10 may be detected by 7-time scan. Further, if seven detection circuit units 14 are used, 7 sensor patterns 10 partitioned in a vertical direction may be scanned once to detect the touch signal, and therefore the signals of the 35 sensor patterns 10 may be detected by 5-time scan in a vertical direction.

The sensor pattern 10 is used to detect the touch signal or used to detect the common voltage. For example, in FIG. 23, a first sensor pattern (processed in an oblique line) of a sixth line in a horizontal direction is not yet an order in that it detects the touch when the touch signal is detected in the sensor pattern 10 including first to fifth lines, and therefore is connected to the common voltage detection circuit unit to detect the common voltage. If the touch detection up to the fifth line is completed and thus the first sensor pattern reaches an order that it detects the touch, as the sensor pattern 10 for detecting the common voltage, the sensor pattern in which the touch detection is already completed or the sensor pattern 10 that does not yet perform the touch detection is used. The signal processor 35 controls the MUX of the driver to determine whether the sensor pattern 10 is connected to the touch detection circuit divided in FIG. 22 or connected to the common voltage detection circuit and transmits the required control signal to the driver 31. The driver 31 connects the sensor pattern 10 to the touch detection circuit unit or the common voltage detection circuit unit depending on the signal transmitted from the signal processor 35. In this case, one or plural common voltage detection circuit units are used and the plurality of common voltage detection circuit units are connected to the plurality of different sensor patterns 10 to detect the common voltage.

It is preferable to lower the resistance of the sensor signal line 22 sourced from the sensor pattern 10 to be connected to the TDI 30 if possible. For this purpose, as illustrated in FIG. 23, the sensor signal line 22 is connected to a corner in a five o'clock direction of the sensor pattern 10 and thus a connection path between the sensor pattern 10 and the TDI may be a shortest distance. A five o'clock direction of the sensor pattern 10 is a path in which the path between the sensor pattern 10 and the TDI is minimized and if the TDI 30 is positioned at an upper side in the configuration of the same sensor pattern 10 as FIG. 23, the sensor signal line 22 is sourced from the vicinity of the corner portion positioned at an 11 o'clock or a 2 o'clock direction of the sensor pattern 10 to be connected to the TDI 30.

Further, as the sensor pattern 10 is far away from the TDI 30, the resistance of the sensor signal line 22 or the parasitic capacitance detected by the sensor signal line 22 is increased, and therefore as the sensor pattern 10 is far away from the TDI 30, a line width of the sensor signal line 22 is wide to reduce the size of the resistance and widen a space between the sensor signal lines 22, thereby reducing the Cp. That is, according to the embodiment of the present invention, the widths of the sensor signal lines 22 are set to be different based on the distance between the sensor pattern 10 and the TDI 30, thereby preventing the deterioration in the touch detection depending on the position of the touch pad 10.

As described above, the touch detector 14 detects the voltage by the D/B, amplifies the detected voltage, and outputs the amplified voltage to an ADC converter 14-5 (or named ADC). As the ADC 14-5 included in the touch detector 14, one ADC is used or a plurality of ADCs 14-5 are used. As the number of used ADCs 14-5 is increased, time to convert the detected analog signal into a digital signal may be getting shorter. However, as the number of ADCs 14-5 is increased, power consumption is increased and the area of the TDI 30 is increased, which is a factor of increasing costs. Therefore, the number of ADCs needs to be appropriately selected in consideration of the power consumption, the area of the TDI 30, and the factor of increasing costs. A DAC 14-3 is also included in the touch detector 14. An output signal of the DAC 14-3 serves to be used as a reference signal forced to the differential amplifier in the configuration of the differential amplifier to be described below and calibrate the voltage detected in each sensor pattern 10.

The timing controller 33 serves to generate a plurality of different clocks which are required in the TDI. For example, a clock is required to operate the CPU 40 and a clock is also required to operate the ADC or sequentially operate the multiplexer of the driver 31. As such, the clocks required for each function may be several and the timing controller 33 may generate and supply a plurality of various clocks.

The common voltage detector 15 is already described, and therefore the detailed description thereof will be omitted.

The signal processor 35 transfers the ADC value generated by the touch detector 14 to the CPU 40, controls the communication unit 46 to transmit the ADC value to the outside of the TDI 30 through an inter integrated circuit (I2C) or a serial peripheral interface bus (SPI) signal line, or generates and supplies signals required in all functional elements inside the TDI 30 such as the touch detector 35 or the driver. Elements for each function or each functional block stand for each function illustrated in FIG. 23. For example, nine functional blocks are included inside the current TDI and the CPU 40 is one of the functional blocks. The signal processor 35 accommodates the ADC value generated in the touch detector 14 in the memory unit 28 or performs the required operation. For example, the signal processor 35 may refer to the ADC value generated in the touch detector 14 to calculate the touched area due to the touch of the sensor pattern 10 and the touch means and may operate the touch coordinates using the ADC value or the operated area value.

The memory unit 28 is configured of a flash memory, an E2PROM, an SRAM, or a DRAM. The flash memory or the E2PROM is stored with result values or register values of factory cal. or programs required to operate the CPU 40. If the set of the sensor patterns 10 consisting of 5×7 in FIG. 23 is defined as a frame, the memory including the detected voltage values of the sensor patterns 10 included in one frame may be called a frame memory. If the frame is sensed several times and an average thereof or a filter is used to detect the touch signal, the plurality of frame memories are required. When the ADC of 10 bits, 12 bits, or 14 bits is used to detect the touch signal, the higher the resolution of the ADC, the larger the size of the frame memory, and therefore storing only an increment (difference between a first value and a second value) based on data first detected and stored in a first frame memory helps reduce the size of the memory.

Meanwhile, the memory unit 28 may also require a line memory. For example, in the embodiment of FIG. 23, when 5 sensor patterns 10 partitioned in a horizontal direction or 7 sensor patterns 10 in a vertical direction are simultaneously detected, the line memory that may store 5 or 7 touch signals is required. When the detected touch data detected by scanning the line plural times is used to take the average thereof or use the filter, a plurality of line memories are required. The line memory has capacity smaller than that of the frame memory, and therefore using the line memory rather than using the frame memory is more efficient in reducing the memory size.

The functions of the CPU 40 considerably overlap with those of the signal processor 35. Therefore, the CPU 40 may not be included in the TDI 30 or may be positioned outside the TDI 30. If the CPU 40 and the signal processor 35 are simultaneously used, one thereof may not be used.

The CPU may perform most of roles which are performed by the signal processor 35 and performs various functions of extracting the touch coordinates or performing gestures such as zoom, rotation, and move. The function may include "palm rejection", smart grip, or the like. Further, the CPU may process data in various forms by calculating the area of the touch input to generate a zooming signal, calculating the strength of the touch input, and recognizing only GUI object desired by the user (for example, having large detected area) as a valid input when GUI objects such as a keypad are simultaneously touched, etc., and use the data inside the TDI 30 or transmit the data to the outside through a communication line.

The program for controlling the CPU 40 is installed in the memory unit 28 and may be replaced by a new program when modifications are generated. The new program may be performed using a communication bus included in the communication unit 46, serial communications of, for example, I2C, SPI, USB, etc., or parallel communication such as a CPU interface (hereinafter, I/F). The CPU 40 calls the plurality of signal detection values stored in the line memory or the frame memory to obtain the average or uses the filter to extract the stabilized value. The value stored in the memory is an ADC value or an area value.

The communication unit 46 serves to output the required information to the outside of the TDI 30 or input information provided from the outside of the TDI 30 to the inside of the TDI. The communication unit uses the serial communication such as the I2C and the SPI or the parallel I/F such as the CPU interface.

As illustrated in FIGS. 21 and 22, the voltage at the point P is converted into the ADC value by the ADC converter 14-3 of the touch detector 14 and is preferably amplified by the amplifier 14-2 prior to being converted into the ADC.

As the amplifier, all amplifiers having various forms such as an inversion amplifier, a non-inversion amplifier, a differential amplifier, and an instrument amplifier may be used. Referring to the above <Equation 1> and <Equation 2>, the meaning that the touch signal is detected is the meaning that the difference between the result of the above <Equation 2> when the Ct is added to the denominator of the above Equation and the result of the above <Equation 1> calculated in the state in which there is no Ct is detected. For example, it is assumed that the above <Equation 1> is always constant and the value is 4 V. Since the Ct is included in the denominator of the above <Equation 2>, the value may not be lager than 4 V and is always equal to or lower than 4 V. The differential amplifier may be used to detect a delicate difference generated in the above <Equation 1> and <Equation 2> based on the difference in the Ct.

Referring to FIG. 23, other sensor signal lines 22 or the sensor patterns 10 are present at the left and right of the sensor signal line 22. In this structure, the capacitance based on the Equation of FIG. 18 is formed between the sensor signal lines 22 or between the sensor signal line 22 and the sensor pattern 10 and based on the above Equation, the longer the opposing distance, the larger the capacitance. Further, when the sensor signal line 22 and the sensor pattern 10 are adjacent to each other, as the number of sensor patterns adjacent to the sensor signal lines 22 is large, the capacitance is getting larger. Further, the capacitance is generated even at the portion where the sensor signal line 22 is connected to the TDI 30, which is changed depending on the material used for the connection, the process conditions, the connection area, or the like. Further, even in the TDI 30, the sensor signal line 22 generates the capacitance by the interference with the signal lines that are disposed at up and down and left and right sides during a layout process. All the capacitances are the parasitic capacitances inevitably generated during the manufacturing of the touch screen 50 and the manufacturing process of the TDI 30 and are shown by the Cp in the above <Equation 1> or <Equation 2>.

The parasitic capacitor Cp is changed depending on the sensor signal line 22, the process conditions, the layout in the TDI 30, or the like, thereby performing the modeling to form the parasitic capacitances having different sizes in each of the sensor patterns 10 of FIG. 23. Depending the modeling, the detected voltage represented by the above <Equation 1> or <Equation 2> or the following <Equation 7> or <Equation 8> is different for each sensor pattern 10, and therefore the Vout output is different for each of the sensor patterns 10.

To calculate the touched area or the touch coordinates, many values are stored in the memory unit 28. For example, to calculate the touched area or the touch coordinates of any sensor pattern, the voltage detected depending on the above <Equation 1>, that is, at the time of the non touch in the sensor pattern is converted into the digital signal by the ADC converter 14-3 and thus is stored in the memory and the Vpre that is the charging voltage is also stored in the memory and the Vdry and Cdrv values are also stored in the memory. The reason is that the Vpre, the Vdrv, or the Cdrv may be applied to each sensor pattern at different sizes. If the Cp is too large in any sensor pattern 10 and thus the touch sensitivity deteriorates, depending on the above <Equation 1> or <Equation 2>, the magnitude of the Vdry or the Cdrv is increased to increase the size of the voltage detected by the D/B, thereby improving the sensitivity.

Using the values written in the memory in real time without calibrating the values may generate an error at the time of the touch detection. For example, the voltage detected at the time of the non touch is a value actually detected depending on the theory of the above <Equation 1>. The analog voltage output from the amplifier 14-2 is converted into the digital value by the ADC converter 14-3 and the difference between the ADC value detected at the time of the touch and the ADC value detected at the time of the non-touch depending on the above <Equation 2> is detected to extract the touched area or the touch coordinates. In this case, the voltage at the time of the non touch depending on the above <Equation 1> is stored in the memory and when the value is used to detect the difference between the voltage stored in the memory and the voltage detected in real time depending on the above <Equation 2>, the signal detected in real time reflects all the changes according to the environment, but the value stored in the memory is a value stored at the time of factory shipments by fac. cal and does not reflect the characteristics change by the environment factors, such that the detection error may occur. Therefore, the values stored in the memory also need to be stored again while reflecting the characteristics changed by the RTC.

For this purpose, the memory area of the memory unit 28 storing the calibrated values is preferably divided into two. When another calibration in addition to the fac. cal or the RTC is needed, the memory area needs to be more separated.

First, when only the fac. cal and the RTC are considered, one side of the memory area separated into two is stored with the values detected or calculated by the fac. cal and another one side of the memory area is stored with values detected during the RTC process or extracted during the calculation process. It may also be required to determine whether to use the fac. cal data or the RTC data during the touch detection process. The reason is that data stored in the memory by the RTC are highly likely to be values affected by noise under the environment that noise is severe, and therefore to reduce the detection error, using the RTC data may incur the more severe detection error than using the data received by the fac. cal. If the CPU 40 or the signal processor 35 includes a means capable of detecting the size of noise, it is possible to determine whether to use the fac. cal data or the RTC data depending on the size of noise.

The CPU 40 or the signal processor 35 may use the value of the ADC converter 14-3 to detect the size of noise. When the touch signal is detected by sequentially scanning the single sensor patterns 10 or the sensor patterns 10 included in the vertical or horizontal group, generally, the voltage by the D/B is not detected only once but is detected plural times to perform the filtering, thereby extracting the wanted data. The technique is to remove the noise included in the detected voltage and extract the more stabilized signal. If any sensor pattern 10 is scanned 100 times and the detected values at each scan are stored, a band of the signal detected 100 times will be formed. For example, the band may range from 2 V to 4 V and may also range from 1 V to 5 V. In the case of the two bands, a central value is equal as 3 V, but a first band is 2 V (4 V−2 V) and a second band is 4 V (5 V−1 V). Therefore, in the case of the touch signal generating a band of 4 V, it may be expected that noise is larger than the band of 2 V. By using the technique, the TDI 30 may use the output of the ADC converter 14-3 to confirm the size of the noise, and therefore the TDI 30 may determine whether to use the fac. cal data stored in the memory or use the RTC data depending on the size of noise. Differently taking the memory data depending on the size of noise is one embodiment and the TDI 30 may determine which data will be used under the given conditions. The determination means may be performed by programs in the TDI 30 and may also be performed by the register.

It is preferable that the RTC is performed in the state in which the touch is not generated. For example, when the user uses a mobile phone using the touch screen 50 of the present invention to perform a call or other operations, the RTC needs to be performed when a call or other operations are completed and then there is no touch input. A basic idea of the calibration finds out the DAC to set the ADC value to be a targeted value when the touch is not generated, stores the found value in the memory, and calls the DAC value when the touch signal of the corresponding sensor pattern 10 is detected and uses it. Therefore, if the calibration is performed when the touch is generated, the touch detection error occurs.

To perform the RTC, it is important to differentiate whether the touch is generated or not at the time when the RTC is performed, and therefore it is important to first perform the determination on whether the touch is generated.

Next, the embodiment to determine whether the touch is generated is performed. The fac. cal data needs to be used at the time when the RTC is first performed. The ADC value detected by using the fac. cal data ranges from 0 to 1023 codes in the case of the resolution of 10 bits. The CPU 40 or the signal processor 35 may calculate the touched area using the ADC value and the area is also present in a predetermined range like the ADC. Therefore, the extracted ADC value or the calculated area is linearly or non-linearly increased or reduced in response to the contact area of the sensor pattern 10 and the touch means such as the finger 25 (in the present specification, it is assumed that as the contact area is wide, it is linearly increased). Since the ADC value or the area is linearly increased between 0 to 1023 codes in response to the touched area, the ADC value when the touch is not generated becomes the foregoing "targeted value" and as the contact area is wide when the touch is generated, the ADC value or the area value is getting increased. It is possible to determine whether the touch is generated by setting the threshold value in this situation. If it is determined that the touch is generated when the ADC value or the area exceeds 300, the touch value is determined to be 300. Therefore, if it is detected that the ADC value or the area is equal to or more than 300, it may be determined that the touch is generated. When it is determined whether the touch is generated, it is more convenient to refer to the group of the sensor patterns 10 distributed in a plurality of adjacent wide areas rather than considering the ADC or the area value for one sensor pattern 10. If the touch means such as the finger 25 contacts the plurality of sensor patterns 10, a Gaussian curve is formed. The TDI 30 may determine the state in which a normal Gaussian curve is detected to be the touch state and determine the state in which the Gaussian curve is not detected to be the non touch state. Even when the threshold value is equal to or less than 300, if it is determined that the Gaussian curve is detected and thus a weak touch is generated, the RTC may not be performed.

The RTC is performed by the same process as the fac. cal. The DAC (cal) value for outputting the previously input targeted value is extracted and the extracted value is stored in the memory, which has unique values for each sensor pattern 10. If the sensor pattern 10 reaches the touch detection order of the corresponding sensor pattern 10, the DAC output value corresponding to the sensor pattern 10 is connected to the amplifier.

The TDI 30 has a means for determining whether to detect the touch using the fac. cal data or using the RTC data. Generally, the TDI 30 may be set as the register or may be positioned in the memory or the program. When the TDI 30 is set as the register, it takes the RTC or the fac. cal data as the corresponding bit is set as high or low. The change in the corresponding bit is determined in the TDI 30 and thus the corresponding bit may be automatically changed and may be changed by the user.

Figure 24:
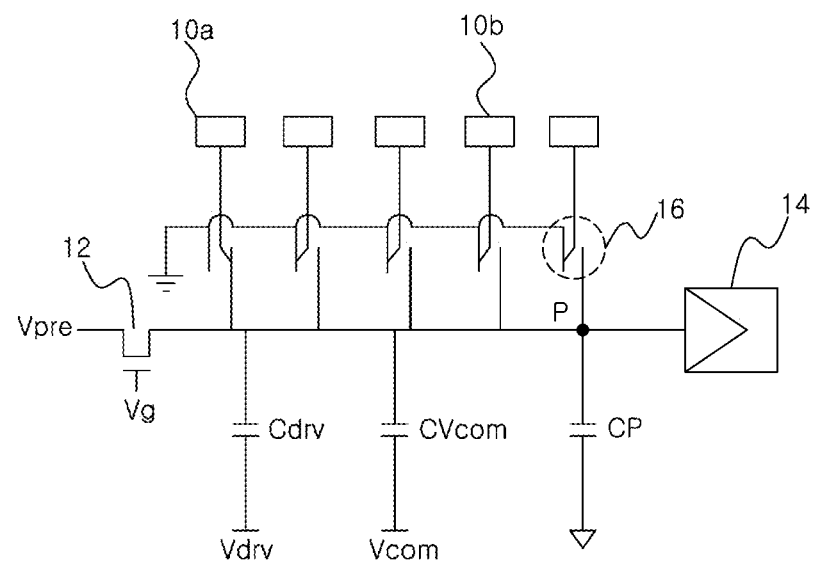

FIG. 24 illustrates the embodiment of the present invention in which the sensor pattern 10 is used as a back ground. Referring to FIG. 24, in the touch detection circuit, the sensor pattern 10 is connected to a switching unit 16, and therefore the sensor pattern 10 has three states. A first state is a floating state in which the sensor pattern 10 is not connected to the switching unit, a second state is a state in which the sensor pattern 10 is connected to the switching unit to be connected to a ground potential that is one side of the switching unit, and a third state is a state in which the sensor pattern 10 is connected to the touch detector 14 connected to one side of the switching unit.

Further, since the charging voltage by the Vpre is applied for a predetermined time to form the discharge path by the charging means 12, the sensor pattern 10 that is detecting the touch may also discharge noise such as ESD to the outside of the touch screen 50 and therefore may serve as the back ground. Therefore, a sensor pattern 10*a* that is detecting the touch or a sensor pattern 10*b* that does not detect the touch may serve as the back ground.

In the embodiment of FIG. 24, if the signal detection operation of the sensor pattern 10*a* that is detecting the touch signal is completed, the completed sensor pattern 10*a* is connected to the ground by the operation of the switching unit. Next, the connection of the sensor pattern 10 with the ground depending on the defined order is released and the sensor pattern 10 is newly connected to the touch signal detector 14 to detect the touch signal. If the plurality of detection circuits as illustrated in FIG. 24 are used, when the sensor patterns 10 are formed vertically and horizontally as illustrated in FIG. 19, the vertical sensor patterns 10 or the horizontal sensor patterns 10 are sequentially scanned to detect the touch and complete the touch detection and then are connected to the ground, and therefore it is possible to detect the touch signal more quickly than scanning the individual sensor pattern 10.

According to the display device integrated with a touch screen in accordance with the present invention, the touch screen of the single layer is formed in the manufacturing process of the display device, thereby minimizing the increase in thickness of the display device due to the formation of the touch screen.

Further, it is possible to prevent the signal line from being observed on the display device by allowing the sensor signal line to be positioned on the same line as the driving signal line of the pixel electrode in the structure in which the sensor pattern and the pixel electrode are stacked.

Further, the plurality of sensor signal lines may be formed in the single sensor pattern disposed in the matrix structure to prevent the recognition error of the touch signal due to the disconnection of the sensor signal line, thereby stably maintaining the touch recognition performance of the display device.

Further, the sensor signal line disposed in the light shielding area of the display device may be formed as the metal wiring to reduce the wiring resistance, thereby minimizing that the signal line is visualized by the user.

Hereinabove, the embodiments of the present invention are described but the technical idea of the present invention is not limited to the foregoing embodiments. Therefore, the display device integrated with a touch screen may be variously implemented without departing from the scope of the present invention.

What is claimed is:

1. A display device integrated with a touch screen, in which a first substrate, a liquid crystal layer, and a second substrate are stacked, wherein
   a color filter and a common electrode are disposed on an upper surface of the first substrate,
   a pixel electrode and a driving signal line are disposed between the liquid crystal layer and the second substrate, and
   a sensor pattern and a sensor signal line are disposed on a lower surface of the second substrate,
   wherein a plurality of sensor patterns are disposed in a matrix structure having at least one column and at least one row,
   wherein each of the plurality of sensor patterns is connected to a touch drive IC (TDI), and
   wherein the TDI is positioned inside a display-drive IC (DDI) driving the display device and is driven in synchronization with the DDI.

2. The display device integrated with a touch screen of claim 1, wherein the sensor signal line and the driving signal line are vertically disposed on the same line.

3. The display device integrated with a touch screen of claim 1, wherein a plurality of color filters are disposed on the upper surface of the first substrate, and
   the driving signal line is vertically disposed on the same line as a black matrix formed between the plurality of color filters.

4. The display device integrated with a touch screen of claim 1, wherein the sensor pattern and the sensor signal line are disposed on the same layer and are made of a transparent conductive material.

5. The display device integrated with a touch screen of claim 1, wherein a portion of the sensor signal line is a first wiring made of a transparent conductive material and the rest portion thereof is a second wiring made of an opaque conductive metal material.

6. The display device integrated with a touch screen of claim 5, wherein the second wiring is disposed in a light shielding area corresponding to an edge portion of the touch screen.

7. The display device integrated with a touch screen of claim 1, wherein a guard layer is further stacked between a first layer on which the sensor pattern and the sensor signal line are disposed and a second layer on which the pixel electrode and the driving signal line are disposed.

8. The display device integrated with a touch screen of claim 7, wherein a passivation layer is further stacked between the first layer and the guard layer and between the guard layer and the second layer.

9. The display device integrated with a touch screen of claim 1, wherein
   each of the plurality of sensor patterns is connected to the TDI through at least two sensor signal lines.

10. A display device integrated with a touch screen, in which a first substrate, a liquid crystal layer, and a second substrate are stacked, wherein
    a pixel electrode and a driving signal line are disposed on an upper surface of the first substrate,
    a color filter and a common electrode are disposed between the liquid crystal layer and the second substrate, and
    a sensor pattern and a sensor signal line are disposed on a lower surface of the second substrate,
    wherein a guard layer is further stacked between a first layer on which the sensor pattern and the sensor signal line are disposed and a second layer on which the color filter is disposed.

11. The display device integrated with a touch screen of claim 10, wherein the sensor signal line and the driving signal line are vertically disposed on the same line.

12. The display device integrated with a touch screen of claim 10, wherein a plurality of color filters are disposed between the liquid crystal layer and the second substrate, and
    the driving signal line is vertically disposed on the same line as a black matrix formed between the plurality of color filters.

13. The display device integrated with a touch screen of claim 10, wherein the sensor pattern and the sensor signal line are disposed on the same layer and are made of a transparent conductive material.

14. The display device integrated with a touch screen of claim 10, wherein a portion of the sensor signal line is a first wiring made of a transparent conductive material and the rest portion thereof is a second wiring made of an opaque conductive metal material.

15. The display device integrated with a touch screen of claim 14, wherein the second wiring is disposed in a light shielding area corresponding to an edge portion of the touch screen.

16. The display device integrated with a touch screen of claim 10, wherein a passivation layer is further stacked between the first layer and the guard layer and between the guard layer and the second layer.

17. The display device integrated with a touch screen of claim 10, wherein a plurality of sensor patterns are disposed in a matrix structure having at least one column and at least one row, and
    each of the plurality of sensor patterns is connected to a touch drive IC (TDI) through at least two sensor signal lines.

18. The display device integrated with a touch screen of claim 17, wherein the TDI is positioned outside a display-drive IC (DDI) driving the display device and is driven in asynchronization with the DDI.

* * * * *